US008244652B2

(12) United States Patent
Menahem et al.

(10) Patent No.: US 8,244,652 B2
(45) Date of Patent: Aug. 14, 2012

(54) STACKING SCHEMA FOR CLASSIFICATION TASKS

(75) Inventors: Eitan Menahem, Hadera (IL); Lior Rokach, Omer (IL); Yuval Elovici, Moshav Arugot (IL)

(73) Assignee: Deutsche Telekom AG, Bonn (DE)

( * ) Notice: Subject to any disclaimer, the term of this patent is extended or adjusted under 35 U.S.C. 154(b) by 734 days.

(21) Appl. No.: 12/349,628

(22) Filed: Jan. 7, 2009

(65) Prior Publication Data

US 2009/0182696 A1  Jul. 16, 2009

(30) Foreign Application Priority Data

Jan. 10, 2008  (IL) .......................................... 188726

(51) Int. Cl.
*G06E 1/00* (2006.01)
*G06E 3/00* (2006.01)
*G06F 15/18* (2006.01)
*G06G 7/00* (2006.01)

(52) U.S. Cl. ................ 706/20; 706/15; 706/16; 706/45; 706/62

(58) Field of Classification Search .................. None
See application file for complete search history.

(56) References Cited

U.S. PATENT DOCUMENTS

2006/0059112 A1   3/2006  Cheng
2009/0157572 A1*  6/2009  Chidlovskii .................... 706/12

OTHER PUBLICATIONS

Sigletos et al. "Combining Information Extraction Systems Using Voting and Stacked Generaliztion", Journal of Machine Learning Research, 2005, pp. 1751-1782.*
Beygelzimer et al. "Weighted One-against-All", American Association for Artificial Intelligence, 2005, 6 pages.*
Chan et al. A Comparative Evaluation of Voting and Meta-Learning on Partitioned Data, Proceedings of the Twelfth International Conference on Machine Learning, 1995, 9 pages.*
Seewald, How to Make Stacking Better and Faster While Also Taking Care of an Unknown Weakness, ICML '02 Proceedings of the Nineteenth International Conference on Machine Learning, 2002, 8 pages.*
Chan, An Extensible Meta-Learning Approach for Scalable and Accurate Inductive Learning, Columbia University, 1996, pp. 1-206.*
Dzeroski S., Zenko B. (2004): "Is Combining Classifiers with Stacking Better than Selecting the Best One?" Machine Learning 54(3), (pp. 255-273).—8 pages.

(Continued)

*Primary Examiner* — Omar Fernandez Rivas
(74) *Attorney, Agent, or Firm* — Roach Brown McCarthy & Gruber, P.C.; Kevin D. McCarthy

(57) ABSTRACT

A method for improving stacking schema for classification tasks, according to which predictive models are built, based on stacked-generalization meta-classifiers. Classifications are combined to build a new scheme from at least two layers and multiclass classification problems are converted into binary classification problems. One-against-all class binarization and regression learners are used for each class model and ensemble classifiers are improved using stacking. Accuracy differences, accuracy ratio, and runtime classification in multiclass datasets are also improved and the class of a value is then predicted.

12 Claims, 23 Drawing Sheets

OTHER PUBLICATIONS

Ting, K. M., Witten, I. H. (1999): Issues in stacked generalization. Journal of Artificial Intelligence Research 10, pp. 271-289. (19 pages) Proceedings of the 5th Annual ACM Workshop on Computational Learning Theory ACM Press, Pittsburgh, PA, pp. 144-152.

Fürnkranz, J. (2002). Pairwise Classification as an Ensemble Technique. European Conference on Machine Learning (pp. 97-110). Helsinki, Finland—12 pages.

Sivalingam D., Pandian N., Ben-Arie J., Minimal Classification Method With Error-Correcting Codes for Multiclass Recognition, International Journal of Pattern Recognition and Artificial Intelligence 19(5): 663-680, 2003—18 pages.

Zhoua J., Pengb H., Suenc C., Data-driven decomposition for multiclass classification, Pattern Recognition 41: 67-76, 2008—28 pages.

* cited by examiner

| Attributes | Class |
|---|---|
| $Attr_{Vec1}$ | $C_a$ |
| $Attr_{Vec2}$ | $C_b$ |
| $Attr_{Vec3}$ | $C_a$ |
| $Attr_{Vec4}$ | $C_c$ |
| . | . |
| . | . |
| . | . |
| $Attr_{Vecn}$ | $C_b$ |

Fig. 1

| $C_a$ | $C_b$ | $C_c$ |
|---|---|---|
| 0.9 | 0.07 | 0.03 |
| 0.1 | 0.85 | 0.05 |
| 0.8 | 0.13 | 0.07 |
| 0.3 | 0.2 | 0.5 |
| . | . | . |
| . | . | . |
| . | . | . |
| 0.2 | 0.75 | 0.05 |

Fig. 2

| Classifier$_1$ | | | Classifier$_2$ | | | ... | Classifier$_n$ | | | Class |
|---|---|---|---|---|---|---|---|---|---|---|
| a | b | c | a | b | c | | a | b | c | |
| $P_{1,a,1}$ | $P_{1,b,1}$ $P_{1,c,1}$ | | $P_{2,a,1}$ | $P_{2,b,1}$ $P_{2,c,1}$ | | ... | $P_{N,a,1}$ | $P_{N,b,1}$ $P_{N,c,1}$ | | $C_a$ $C_b$ |
| $P_{1,a,2}$ | $P_{1,b,2}$ $P_{1,c,2}$ | | $P_{2,a,2}$ | $P_{2,b,2}$ $P_{2,c,2}$ | | ... | $P_{N,a,2}$ | $P_{N,b,2}$ $P_{N,c,2}$ | | $C_a$ $C_c$ |
| $P_{1,a,3}$ | $P_{1,b,3}$ $P_{1,c,3}$ | | $P_{2,a,3}$ | $P_{2,b,3}$ $P_{2,c,3}$ | | ... | $P_{N,a,3}$ | $P_{N,b,3}$ $P_{N,c,3}$ | | $C_b$ |
| $P_{1,a,4}$ | $P_{1,b,4}$ $P_{1,c,4}$ | | $P_{2,a,4}$ | $P_{2,b,4}$ $P_{2,c,4}$ | | | $P_{N,a,4}$ | $P_{N,b,4}$ $P_{N,c,4}$ | | |
| $P_{1,a,n}$ | $P_{1,b,n}$ $P_{1,c,n}$ | | $P_{2,a,n}$ | $P_{2,b,n}$ $P_{2,c,n}$ | | | $P_{N,a,n}$ | $P_{N,b,n}$ $P_{N,c,n}$ | | |

Fig. 3

| Classifier$_1$ | Classifier$_2$ | ... | Classifier$_n$ | Class=$a$? |
|---|---|---|---|---|
| $P_{1,a,1}$ | $P_{2,a,1}$ | ... | $P_{N,a,1}$ | 1 |
| $P_{1,a,2}$ | $P_{2,a,2}$ | ... | $P_{N,a,2}$ | 0 |
| $P_{1,a,3}$ | $P_{2,a,3}$ | ... | $P_{N,a,3}$ | 1 |
| $P_{1,a,4}$ | $P_{2,a,4}$ | ... | $P_{N,a,4}$ | 0 |
| ... | | | | |
| $P_{1,a,n}$ | $P_{2,a,n}$ | ... | $P_{N,a,n}$ | 0 |

Fig. 4

Procedure: Train_Troika

Input: original-dataset: Dataset, folds: Integer

{ dataset ← initialize new group of empty Datasets

For layer = 0 to 3 do:

{

For each fold in folds do:

{

Split original-dataset to train-set and test-set (according to current fold number)

If layer <> 3 Do:

new-Instances ← Train_SingleLayer( layer, trainset, folds)

Add new-Instances to dataset[layer+1]

Else Train_SingleLayer( layer, trainset, folds)

} layer = layer + 1

}

Rebuild Base classifiers using trainset

Procedure: Train_SingleLayer

Input: *LayerNumber*: Integer, *dataset*: Dataset, *folds*: Integer

Output: *successor_Dataset*: Dataset

{

Successor_Dataset ← emptyGroup

For each *fold* in *folds* do:

{

Split *original-dataset* to *train-set* and *test-set*

(according to current fold number)

Build_Classifiers(*LayerNumber*, *train-set*)

For each *instance* in *test-set*

{

Produce *probabilities-vector* by applying *instance* on current layer classifiers.

Generate a new *Instance* from the *probabilities-vector*

Add the new *Instance* to *successor_Dataset*

}

}

Return *successor_Dataset*

| Classifier$_1$ | | Classifier$_2$ | | ... | Classifier$_l$ | | Class=$i$? |
|---|---|---|---|---|---|---|---|
| $P_{1,i,1}$ | $P_{1,j,1}$ | $P_{2,i,1}$ | $P_{2,j,1}$ | ... | $P_{l,i,1}$ | $P_{l,j,1}$ | 1 |
| $P_{1,i,2}$ | $P_{1,j,2}$ | $P_{2,i,2}$ | $P_{2,j,2}$ | ... | $P_{l,i,2}$ | $P_{l,j,2}$ | 0 |
| $P_{1,i,3}$ | $P_{1,j,3}$ | $P_{2,i,3}$ | $P_{2,j,3}$ | ... | $P_{l,i,3}$ | $P_{l,j,3}$ | 1 |
| $P_{1,i,4}$ | $P_{1,j,4}$ | $P_{2,i,4}$ | $P_{2,j,4}$ | ... | $P_{l,i,4}$ | $P_{l,j,4}$ | 0 |
| ... | ... | ... | ... | ... | ... | ... | ... |
| $P_{1,i,n}$ | $P_{1,j,n}$ | $P_{2,i,n}$ | $P_{2,j,n}$ | ... | $P_{l,i,n}$ | $P_{l,j,n}$ | 0 |

Fig. 9

| $Sp_{0\text{-}m}$ | $Sp_{1\text{-}m}$ | | $Sp_{(m-1)\text{-}m}$ | $Sp_{m\text{-}(m+1)}$ | | $Sp_{m\text{-}k}$ | Class=$m$? |
|---|---|---|---|---|---|---|---|
| $P_{1,i,1}$ | $P_{2,i,1}$ | ... | $P_{l,i,1}$ | $P_{l,i,1}$ | ... | $P_{l,i,1}$ | 1 |
| $P_{1,i,2}$ | $P_{2,i,2}$ | ... | $P_{l,i,2}$ | $P_{l,i,2}$ | ... | $P_{l,i,2}$ | 0 |
| $P_{1,i,3}$ | $P_{2,i,3}$ | ... | $P_{l,i,3}$ | $P_{l,i,3}$ | ... | $P_{l,i,3}$ | 1 |
| $P_{1,i,4}$ | $P_{2,i,4}$ | ... | $P_{l,i,4}$ | $P_{l,i,4}$ | ... | $P_{l,i,4}$ | 0 |
| ... | ... | ... | ... | ... | ... | ... | ... |
| $P_{1,i,n}$ | $P_{2,i,n}$ | ... | $P_{l,i,n}$ | $P_{l,i,n}$ | ... | $P_{l,i,n}$ | 0 |

Fig. 10

| Meta-classifier$_0$ | Meta-classifier$_1$ | ... | Meta-classifier$_k$ | Class |
|---|---|---|---|---|
| $P_0(1)$ | $P_1(1)$ | ... | $P_k(1)$ | $C_a$ |
| $P_0(2)$ | $P_1(2)$ | ... | $P_k(2)$ | $C_b$ |
| $P_0(3)$ | $P_1(3)$ | ... | $P_k(3)$ | $C_a$ |
| $P_0(4)$ | $P_1(4)$ | ... | $P_k(4)$ | $C_c$ |
| ... | ... | ... | ... | ... |
| $P_0(n)$ | $P_1(n)$ | ... | $P_k(n)$ | $C_b$ |

Fig. 11

| Dataset | #Classes | #Instances | #Attributes |
|---|---|---|---|
| Anneal | 6 | 898 | 39 |
| Autos | 5 | 202 | 26 |
| Balance-scale | 3 | 625 | 5 |
| Diabetes | 2 | 767 | 9 |
| Flag | 6 | 193 | 30 |
| Glass[1] | 5 | 205 | 10 |
| heart-statlog | 2 | 270 | 14 |
| Hepatitis Domain | 2 | 155 | 20 |
| Votes | 2 | 435 | 17 |
| Ionosphere | 2 | 351 | 35 |
| Iris | 3 | 150 | 5 |
| KRKOPT | 17 | 7,015 | 6 |
| KR-vs-KP | 2 | 3196 | 37 |
| LED7 | 10 | 3,200 | 8 |
| Letter[2] | 26 | 2,500 | 17 |
| Segment | 7 | 2,310 | 20 |
| Sonar | 2 | 208 | 61 |
| Soybean | 19 | 683 | 36 |
| Splice | 3 | 3190 | 62 |
| Vehicle | 4 | 846 | 19 |
| Vowel | 11 | 990 | 14 |
| Waveform | 3 | 5,000 | 41 |
| Zoo | 7 | 101 | 18 |

Fig. 12

| Inst# | Instance |
|---|---|
| 1 | $Instance_1$ |
| 2 | $Instance_2$ |
| . | . |
| . | . |
| . | . |
| . | . |
| 100 | $Instance_{100}$ |

Train-set

| Inst# | Instance |
|---|---|
| 1 | $Instance_1$ |
| 2 | $Instance_2$ |
| . | . |
| . | . |
| . | . |
| 100 | $Instance_{100}$ |
| 101 | $Instance_1$ |
| 102 | $Instance_2$ |
| . | . |
| . | . |
| 125 | $Instance_{25}$ |

$Train\text{-}set_1$

| Inst# | Instance |
|---|---|
| 1 | $Instance_{26}$ |
| 2 | $Instance_{27}$ |
| . | . |
| . | . |
| . | $Instance_{100}$ |
| . | $Instance_1$ |
| 100 | $Instance_2$ |
| 101 | . |
| 102 | . |
| . | . |
| . | . |
| 125 | $Instance_{50}$ |

$Train\text{-}set_2$

Fig. 13

| Dataset | Accuracy | | | | Area Under ROC | | | Execution time | | |
|---|---|---|---|---|---|---|---|---|---|---|
| | Stacking | StackingC | Troika | Best B.C. | Stacking | StackingC | Troika | Stacking | StackingC | Troika |
| Heart-statlog | 83.80 ± 6.22 | 83.93 ± 6.10 | 84 ± 6.25 | 83.89 | 0.90 ± 0.06 | 0.90 ± 0.06 | 0.90 ± 0.06 | 1.70 ± 0.42 | 1.65 ± 0.06 | 1.74 ± 0.08 |
| Diabetes | 75.91 ± 3.91 | 75.91 ± 3.91 | 75.85 ± 3.97 | 77.1 | 0.82 ± 0.04 | 0.82 ± 0.04 | 0.82 ± 0.04 | -3.22 ± 0.11 | 4.08 ± 0.09 | 4.19 ± 0.12 |
| Sonar | 78.74 ± 11.01 | 78.74 ± 11.01 | 85.05 ± 10.85 | 86.17 | 0.85 ± 0.11 | 0.85 ± 0.11 | 0.85 ± 0.11 | 1.10 ± 0.95 | 1.42 ± 1.27 | 2.32 ± 2.17 |
| Hepatitis | 69.22 ± 10.78 | 69.22 ± 10.78 | 69.6 ± 11.02 | 69.71 | 0.73 ± 0.13 | 0.73 ± 0.13 | 0.73 ± 0.13 | 1.70 ± 0.54 | 1.82 ± 0.50 | 2.14 ± 0.89 |
| Votes | 96.06 ± 3.14 | 96.06 ± 3.14 | 96.13 ± 2.95 | 96.57 | 0.99 ± 0.02 | 0.97 ± 0.03 | 0.99 ± 0.02 | -1.72 ± 0.08 | 2.25 ± 0.08 | 2.29 ± 0.10 |
| Ionosphere | 93.25 ± 4.12 | 93.25 ± 4.12 | 93.14 ± 4.09 | 94.5 | 0.97 ± 0.03 | -1.00 ± 0.00 | 0.97 ± 0.03 | -2.20 ± 0.13 | -2.84 ± 0.12 | 3.24 ± 0.25 |
| Kr-vs-kp | 99.51 ± 0.42 | 99.53 ± 0.37 | 99.48 ± 0.39 | 99.44 | -1.00 ± 0.00 | +0.82 ± 0.04 | 0.99 ± 0.00 | -62.54 ± 4.18 | +112.03 ± 1.64 | 90.99 ± 2.39 |
| balance-scale | 93.76 ± 2.84 | 90.63 ± 2.37 | 93.87 ± 2.84 | 90.53 | 0.99 ± 0.01 | 0.99 ± 0.01 | 0.99 ± 0.01 | 6.90 ± 0.18 | 7.42 ± 0.19 | 7.74 ± 19.14 |
| Iris | 94.13 ± 6.01 | 87.33 ± 9.06 | 95.2 ± 5.53 | 96.27 | 1.00 ± 0.00 | 1.00 ± 0.00 | 1.00 ± 0.00 | -1.29 ± 0.11 | 1.64 ± 0.16 | 1.74 ± 0.28 |
| splice | +90.87 ± 2.04 | +84.95 ± 3.02 | 96.1 ± 1.04 | 95.54 | 0.99 ± 0.01 | 0.99 ± 0.01 | 0.99 ± 0.01 | -187.6 ± 39.1 | +714.14 ± 10.69 | 582.31 ± 11.11 |
| Waveform | 84.64 ± 1.86 | 82.88 ± 1.26 | 85.56 ± 2.2 | 80.01 | 0.95 ± 0.01 | 0.96 ± 0.01 | 0.95 ± 0.01 | -503.0 ± 130.7 | +1640.30 ± 4.09 | 684.38 ± 2.79 |
| Vehicle | 73.00 ± 4.72 | 69.56 ± 6.59 | 75.59 ± 5.77 | 74.08 | 0.79 ± 0.09 | 0.78 ± 0.11 | 0.85 ± 0.05 | +425.9 ± 997.1 | +42.52 ± 12.04 | 24.70 ± 7.48 |
| Glass(5 classes) | +49.40 ± 12.64 | +60.00 ± 10.56 | 71.15 ± 9.37 | 70.27 | +0.75 ± 0.10 | 0.80 ± 0.10 | 0.91 ± 0.06 | +30.8 ± 5.84 | 5.52 ± 0.66 | 6.15 ± 0.23 |
| Autos | 57.12 ± 11.32 | 60.98 ± 11.42 | 78.83 ± 10.82 | 81.77 | 0.89 ± 0.13 | 0.94 ± 0.06 | 0.96 ± 0.08 | +43.2 ± 8.2 | +17.96 ± 1.55 | 10.04 ± 0.28 |
| Flag | +38.60 ± 10.82 | 46.84 ± 12.16 | 62.46 ± 7.41 | 60.72 | 0.64 ± 0.14 | 0.72 ± 0.11 | 0.79 ± 0.12 | +207.7 ± 32.7 | +48.49 ± 11.55 | 17.02 ± 1.01 |
| Anneal | 97.25 ± 1.57 | +89.82 ± 4.97 | 97.33 ± 1.84 | 95.49 | 0.79 ± 0.30 | 0.92 ± 0.19 | 0.82 ± 0.26 | -23.1 ± 0.2 | +97.02 ± 1.47 | 68.21 ± 1.75 |
| Zoo | 99.30 ± 2.68 | 98.56 ± 3.75 | 98.93 ± 3.28 | 98.9 | 1.00 ± 0.01 | 1.00 ± 0.00 | 1.00 ± 0.01 | +21.2 ± 5.9 | 5.63 ± 0.12 | 4.45 ± 0.21 |
| Segment | 96.89 ± 0.90 | +87.67 ± 4.67 | 97.71 ± 0.83 | 96.79 | 0.99 ± 0.01 | 0.99 ± 0.01 | 1.00 ± 0.01 | +211.7 ± 12.3 | +1327.59 ± 63.83 | 163.26 ± 10.59 |
| LED7 | 71.53 ± 3.04 | +57.99 ± 5.90 | 71.17 ± 3.58 | 73.59 | 0.91 ± 0.05 | 0.89 ± 0.07 | 0.93 ± 0.06 | +353.1 ± 14.4 | +602.48 ± 22.99 | 299.25 ± 1.51 |
| vowel | +76.69 ± 4.84 | +66.85 ± 5.88 | 94.43 ± 2.23 | 99.05 | 1.00 ± 0.01 | 1.00 ± 0.00 | 0.99 ± 0.03 | 61.2 ± 3.8 | 91.81 ± 3.56 | 464.64 ± 286.28 |
| KRKOPT (25%) | +50.74 ± 2.03 | +34.53 ± 1.84 | 56.99 ± 1.91 | 59.11 | 0.74 ± 0.04 | 0.77 ± 0.07 | 0.82 ± 0.04 | +10196 ± 63.9 | 1356.86 ± 42.26 | 7391.03 ± 34.06 |
| Soybean | 90.87 ± 3.80 | +74.62 ± 5.22 | 89.51 ± 4.18 | 93.1 | +1.00 ± 0.00 | +1.00 ± 0.00 | 1.00 ± 0.00 | 1244.2 ± 269.4 | 2033.01 ± 920.61 | 1003.86 ± 188.51 |
| Letter (12.5%) | 66.94 ± 2.86 | +40.22 ± 2.75 | 71.24 ± 3.14 | 85.2 | 0.94 ± 0.04 | 0.93 ± 0.09 | 0.94 ± 0.09 | -450.0 ± 17.7 | +3768.95 ± 122.76 | 1517.95 ± 44.92 |
| Average UCI | 79.49 ± 4.96 | +75.22 ± 5.69 | 84.02 ± 4.59 | 82.360 | 0.90 ± 0.06 | 0.91 ± 0.05 | 0.92 ± 0.05 | | | |

Fig. 14

| Dataset | Accuracy | | | | Area Under ROC | | | Execution time | | |
|---|---|---|---|---|---|---|---|---|---|---|
| | Stacking | StackingC | Troika | Best B.C. | Stacking | StackingC | Troika | Stacking | StackingC | Troika |
| heart-statlog | 82.59 ± 6.44 | 82.59 ± 6.44 | 82.52 ± 6.58 | 79.89 | 0.90 ± 0.06 | 0.90 ± 0.06 | 0.90 ± 0.06 | -0.84 ± 0.07 | 0.97 ± 0.05 | 0.99 ± 0.05 |
| Diabetes | 75.95 ± 4.21 | 75.95 ± 4.21 | 75.98 ± 4.06 | 74.92 | 0.82 ± 0.05 | 0.82 ± 0.05 | 0.82 ± 0.05 | -2.08 ± 0.07 | +2.70 ± 0.07 | 2.56 ± 0.07 |
| Sonar | 85.73 ± 8.67 | 85.73 ± 8.67 | 85.68 ± 8.76 | 86.17 | 0.92 ± 0.07 | 0.92 ± 0.07 | 0.92 ± 0.07 | -1.55 ± 0.07 | +1.94 ± 0.07 | 1.80 ± 0.06 |
| Hepatitis | 69.09 ± 12.38 | 69.09 ± 12.38 | 69.16 ± 12.66 | 67.98 | 0.75 ± 0.14 | 0.75 ± 0.14 | 0.75 ± 0.14 | 0.72 ± 0.05 | 0.72 ± 0.05 | 0.76 ± 0.04 |
| Votes | 95.58 ± 2.94 | 95.58 ± 2.94 | 95.58 ± 2.96 | 96.57 | 0.97 ± 0.03 | 0.97 ± 0.03 | 0.97 ± 0.03 | -1.23 ± 0.06 | 1.60 ± 0.06 | 1.54 ± 0.05 |
| Ionosphere | 91.17 ± 4.45 | 91.17 ± 4.45 | 91.22 ± 4.46 | 94.5 | 0.95 ± 0.04 | 0.95 ± 0.04 | 0.95 ± 0.04 | -1.66 ± 0.07 | +2.17 ± 0.06 | 2.02 ± 0.07 |
| Kr-vs-kp | 99.45 ± 0.46 | 99.52 ± 0.33 | 99.45 ± 0.44 | 99.44 | 1.00 ± 0.00 | 1.00 ± 0.00 | 1.00 ± 0.00 | -66.47 ± 4.70 | +124.56 ± 5.35 | 89.64 ± 4.28 |
| balance-scale | 92.45 ± 2.87 | 89.14 ± 2.16 | 91.04 ± 3.00 | 86.72 | 0.99 ± 0.01 | 0.99 ± 0.01 | 0.99 ± 0.01 | +4.75 ± 0.39 | +5.34 ± 0.52 | 3.07 ± 0.13 |
| Iris | 93.60 ± 5.68 | 88.00 ± 9.48 | 95.47 ± 4.63 | 96.07 | 1.00 ± 0.01 | 1.00 ± 0.00 | 1.00 ± 0.00 | +1.65 ± 0.27 | +0.97 ± 0.06 | 0.79 ± 0.05 |
| Splice | 93.98 ± 1.64 | +85.96 ± 2.45 | 95.99 ± 0.92 | 94.03 | 0.99 ± 0.01 | 0.99 ± 0.01 | 0.99 ± 0.01 | -98.11 ± 6.20 | +620.25 ± 5.70 | 489.20 ± 2.43 |
| Waveform | 83.77 ± 1.61 | +79.90 ± 1.78 | 84.45 ± 1.70 | 77.67 | 0.95 ± 0.01 | 0.95 ± 0.01 | 0.95 ± 0.01 | -97.54 ± 0.83 | +168.74 ± 0.96 | 116.21 ± 1.50 |
| Vehicle | 72.05 ± 4.77 | 71.26 ± 5.23 | 75.12 ± 3.57 | 72.28 | 0.85 ± 0.05 | 0.84 ± 0.04 | 0.86 ± 0.03 | +46.42 ± 17.21 | +23.74 ± 5.85 | 10.86 ± 0.15 |
| Glass(5 classes) | +53.88 ± 14.59 | 68.29 ± 10.76 | 74.22 ± 9.50 | 70.27 | 0.84 ± 0.11 | 0.90 ± 0.07 | 0.92 ± 0.07 | +419.9 ± 708.8 | 4.57 ± 1.42 | 3.11 ± 0.31 |
| Autos | +59.80 ± 12.31 | +62.74 ± 10.21 | 79.39 ± 8.92 | 81.77 | 0.90 ± 0.12 | 0.93 ± 0.10 | 0.94 ± 0.09 | +27.83 ± 55.89 | +9.40 ± 0.51 | 6.26 ± 0.52 |
| Flag | +40.68 ± 12.33 | 50.58 ± 12.24 | 61.00 ± 9.44 | 57.32 | 0.63 ± 0.14 | 0.75 ± 0.11 | 0.78 ± 0.10 | +94.78 ± 26.44 | +17.61 ± 1.19 | 8.37 ± 0.12 |
| Anneal | 97.81 ± 2.00 | +92.50 ± 3.02 | 97.96 ± 1.47 | 95.49 | 0.85 ± 0.29 | 0.88 ± 0.25 | 0.95 ± 0.13 | -12.62 ± 0.82 | +60.54 ± 0.31 | 39.68 ± 0.45 |
| Zoo | 97.94 ± 4.72 | 98.57 ± 3.73 | 96.28 ± 7.01 | 98.9 | 1.00 ± 0.00 | 1.00 ± 0.00 | 0.99 ± 0.04 | +14.32 ± 1.88 | +3.35 ± 0.07 | 2.53 ± 0.07 |
| Segment | 96.93 ± 1.18 | +83.10 ± 4.07 | 97.61 ± 0.91 | 96.79 | 0.99 ± 0.01 | 0.99 ± 0.01 | 1.00 ± 0.01 | +187.66 ± 11 | +1184.7 ± 198.1 | 136.76 ± 2.63 |
| LED7 | 71.63 ± 2.43 | +56.72 ± 6.01 | 71.51 ± 2.72 | 73.48 | 0.91 ± 0.05 | 0.88 ± 0.05 | 0.93 ± 0.04 | +265.29 ± 3.07 | +458.19 ± 3.03 | 224.50 ± 2.39 |
| Vowel | +63.98 ± 4.99 | +41.43 ± 4.90 | 74.46 ± 5.05 | 99.05 | 0.93 ± 0.07 | 0.94 ± 0.08 | 0.97 ± 0.04 | +393.23 ± 1.72 | +726.97 ± 3.12 | 300.10 ± 1.47 |
| KRKOPT (25%) | +48.49 ± 7.03 | +32.51 ± 3.29 | 65.33 ± 8.32 | 59.11 | -0.69 ± 0.04 | 0.79 ± 0.09 | 0.82 ± 0.06 | -596.32 ± 6.19 | +3432.22 ± 6.08 | 1667.22 ± 3.19 |
| Soybean | 90.68 ± 3.10 | +67.84 ± 4.67 | 87.99 ± 3.60 | 93.06 | 0.99 ± 0.05 | 1.00 ± 0.00 | 0.98 ± 0.06 | +1723.3 ± 69.8 | +3075.1 ± 203.2 | 1111.73 ± 35.3 |
| Letter (12.5%) | +63.29 ± 3.49 | +34.17 ± 3.57 | 77.63 ± 3.04 | 85.2 | 0.94 ± 0.06 | 0.94 ± 0.08 | 0.94 ± 0.05 | -434.49 ± 18.47 | +3569.6 ± 233.3 | 1243.56 ± 39.66 |
| Average UCI | 80.32 ± 5.19 | 74.91 ± 5.41 | 84.19 ± 4.86 | 82.360 | 0.91 ± 0.06 | 0.92 ± 0.06 | 0.93 ± 0.05 | | | |

Fig. 15

| Dataset | Accuracy | | | Best B.C. | Area Under ROC | | | Execution time | | |
|---|---|---|---|---|---|---|---|---|---|---|
| | Stacking | StackingC | Troika | | Stacking | StackingC | Troika | Stacking | StackingC | Troika |
| Heart-statlog | 76.33 ± 7.41 | 76.33 ± 7.41 | 76.33 ± 7.41 | 78.15 | 0.81 ± 0.09 | 0.81 ± 0.09 | 0.81 ± 0.09 | 0.36 ± 0.06 | -0.39 ± 0.06 | 0.52 ± 0.07 |
| Diabetes | 71.44 ± 3.89 | 71.44 ± 3.89 | 71.52 ± 3.94 | 74.92 | 0.74 ± 0.06 | 0.74 ± 0.06 | 0.74 ± 0.06 | 0.73 ± 0.07 | 0.86 ± 0.14 | 1.01 ± 0.10 |
| Sonar | 72.08 ± 9.03 | 72.08 ± 9.03 | 72.08 ± 9.03 | 73.61 | 0.77 ± 0.10 | 0.77 ± 0.10 | 0.77 ± 0.10 | 0.34 ± 0.05 | 0.37 ± 0.06 | 0.51 ± 0.10 |
| Hepatitis | 51.86 ± 12.23 | 51.86 ± 12.23 | 51.86 ± 12.23 | 53.18 | 0.63 ± 0.15 | 0.63 ± 0.15 | 0.63 ± 0.15 | 0.32 ± 0.05 | 0.34 ± 0.06 | 0.44 ± 0.08 |
| Votes | 95.63 ± 2.82 | 95.63 ± 2.82 | 95.63 ± 2.82 | 96.57 | 0.97 ± 0.03 | 0.97 ± 0.03 | 0.97 ± 0.03 | 0.34 ± 0.06 | 0.40 ± 0.06 | 0.57 ± 0.09 |
| Ionosphere | 89.20 ± 4.46 | 89.20 ± 4.46 | 89.20 ± 4.46 | 89.74 | 0.91 ± 0.05 | 0.91 ± 0.05 | 0.91 ± 0.05 | 0.35 ± 0.05 | -0.39 ± 0.07 | 0.53 ± 0.07 |
| Kr-vs-kp | 99.55 ± 0.34 | 99.56 ± 0.31 | 99.61 ± 0.32 | 99.44 | 1.00 ± 0.00 | 1.00 ± 0.00 | 1.00 ± 0.00 | 5.66 ± 0.26 | -10.01 ± 0.31 | 11.79 ± 0.62 |
| Balance-scale | 81.08 ± 3.45 | 79.40 ± 3.37 | 81.08 ± 3.45 | 77.82 | 0.94 ± 0.04 | 0.86 ± 0.05 | 0.93 ± 0.04 | 1.28 ± 0.15 | 1.18 ± 0.16 | 1.40 ± 0.11 |
| Iris | 93.60 ± 5.52 | +66.00 ± 2.01 | 93.60 ± 5.52 | 94.73 | 0.99 ± 0.02 | 0.99 ± 0.03 | 0.99 ± 0.02 | 0.35 ± 0.08 | -0.33 ± 0.07 | 0.58 ± 0.12 |
| Splice | 94.08 ± 1.53 | 93.59 ± 1.84 | 94.26 ± 1.70 | 94.03 | 0.96 ± 0.02 | 0.97 ± 0.01 | 0.97 ± 0.01 | +195.33 ± 1.67 | -9.14 ± 1.59 | 13.46 ± 1.60 |
| Waveform | 75.62 ± 2.34 | +68.30 ± 2.16 | 75.56 ± 2.34 | 75.08 | +0.99 ± 0.02 | +0.98 ± 0.03 | 0.86 ± 0.02 | 42.25 ± 0.52 | +81.18 ± 0.76 | 53.73 ± 0.57 |
| Vehicle | 74.68 ± 4.56 | 70.63 ± 4.63 | 74.68 ± 4.56 | 72.28 | 0.86 ± 0.04 | 0.84 ± 0.05 | 0.84 ± 0.04 | +3.20 ± 0.10 | 2.11 ± 0.12 | 2.58 ± 0.14 |
| Glass(5 classes) | 56.42 ± 11.07 | 54.64 ± 9.79 | 70.19 ± 9.43 | 57.63 | 0.86 ± 0.08 | 0.87 ± 0.07 | 0.87 ± 0.08 | 3.91 ± 13.40 | 0.58 ± 0.28 | 0.84 ± 0.19 |
| Autos | 72.15 ± 9.67 | 55.81 ± 9.16 | 72.15 ± 9.67 | 81.77 | 0.95 ± 0.07 | 0.96 ± 0.06 | 0.95 ± 0.07 | +2.27 ± 0.18 | 1.18 ± 0.13 | 1.28 ± 0.14 |
| Flag | 60.74 ± 10.08 | 58.21 ± 7.80 | 60.74 ± 10.08 | 56.71 | 0.80 ± 0.10 | 0.83 ± 0.09 | 0.81 ± 0.10 | +5.26 ± 1.62 | 1.67 ± 0.15 | 1.81 ± 0.16 |
| Anneal | 90.25 ± 9.90 | 83.07 ± 5.07 | 93.81 ± 6.10 | 92.35 | 0.92 ± 0.18 | 0.92 ± 0.20 | 0.93 ± 0.19 | +17.31 ± 11.30 | -0.77 ± 0.04 | 1.92 ± 0.26 |
| Zoo | 93.93 ± 7.21 | +78.69 ± 6.69 | 93.93 ± 7.21 | 92.61 | 0.86 ± 0.02 | 0.86 ± 0.02 | 0.97 ± 0.10 | +1.10 ± 0.22 | -0.54 ± 0.06 | 0.73 ± 0.11 |
| Segment | 94.49 ± 2.79 | +42.72 ± 5.14 | 95.84 ± 2.58 | 96.93 | 1.00 ± 0.00 | 1.00 ± 0.01 | 1.00 ± 0.01 | -35.89 ± 0.20 | 2.25 ± 0.13 | 57.79 ± 4.59 |
| LED7 | 70.56 ± 2.84 | +24.84 ± 5.13 | 70.98 ± 2.94 | 73.34 | 0.90 ± 0.04 | 0.91 ± 0.05 | 0.93 ± 0.03 | +153.77 ± 0.86 | 8.90 ± 0.17 | 38.72 ± 5.21 |
| vowel | 74.72 ± 4.61 | +35.13 ± 3.49 | 79.82 ± 4.18 | 80.2 | 0.97 ± 0.03 | 0.97 ± 0.03 | 0.99 ± 0.01 | 48.21 ± 2.96 | 3.24 ± 0.77 | 287.01 ± 206.10 |
| KRKOPT (25%) | 49.15 ± 2.11 | +17.50 ± 1.26 | 52.45 ± 2.61 | 54.69 | 0.73 ± 0.05 | 0.83 ± 0.07 | 0.83 ± 0.05 | +1671.34 ± 7.81 | +3283.85 ± 14.10 | 1374.35 ± 10.69 |
| Soybean | 90.66 ± 4.02 | +22.73 ± 0.88 | 90.80 ± 6.93 | 91.78 | 0.99 ± 0.05 | 1.00 ± 0.01 | 1.00 ± 0.00 | 19.36 ± 1.18 | 20.51 ± 1.10 | 20.33 ± 2.18 |
| Letter (12.5%) | 58.56 ± 2.68 | +7.37 ± 0.53 | 52.32 ± 5.67 | 73.19 | 0.88 ± 0.10 | 0.93 ± 0.07 | 0.91 ± 0.08 | -193.57 ± 6.16 | +342.59 ± 6.03 | 218.66 ± 2.13 |
| Average UCI | 79.79 ± 5.20 | 54.90 ± 4.58 | 80.29 ± 5.50 | 79.254 | 0.89 ± 0.06 | 0.90 ± 0.06 | 0.90 ± 0.06 | | | |

Fig. 16

| Binarization method | #Inducers | Stacking | StackingC | Troika | Arrangement average |
|---|---|---|---|---|---|
| 1A1 | 1 | 78.14 | 70.90 | 78.19 | |
| 1A1 | 3 | 75.25 | 77.66 | 81.72 | 77.80 |
| 1A1 | 6 | 78.89 | 77.93 | 81.48 | |
| 1AA | 1 | 73.03 | 79.24 | 80.40 | |
| 1AA | 3 | 79.88 | 79.03 | 80.26 | 78.86 |
| 1AA | 6 | 77.42 | 79.23 | 81.25 | |
| AAA | 1 | 79.36 | 80.03 | 79.74 | |
| AAA | 3 | 78.83 | 81.60 | 81.48 | 80.35 |
| AAA | 6 | 78.95 | 81.11 | 82.01 | |
| Average | - | 77.75 | 78.53 | 80.73 | |

Fig. 21

| Binarization method | #Inducers | Stacking | StackingC | Troika | Arrangement average |
|---|---|---|---|---|---|
| 1A1 | 1 | 0.87 | 0.87 | 0.87 | |
| 1A1 | 3 | 0.88 | 0.90 | 0.91 | 0.88 |
| 1A1 | 6 | 0.86 | 0.86 | 0.88 | |
| 1AA | 1 | 0.84 | 0.86 | 0.87 | |
| 1AA | 3 | 0.86 | 0.85 | 0.89 | 0.86 |
| 1AA | 6 | 0.85 | 0.88 | 0.89 | |
| AAA | 1 | 0.86 | 0.87 | 0.86 | |
| AAA | 3 | 0.85 | 0.88 | 0.89 | 0.87 |
| AAA | 6 | 0.85 | 0.88 | 0.89 | |
| Average | - | 0.86 | 0.87 | 0.88 | |

Fig. 22

| Binarization method | #Inducers | Stacking | StackingC | Troika | Arrangement average |
|---|---|---|---|---|---|
| 1A1 | 1 | 3.27 | 1.42 | 1.66 | |
| 1A1 | 3 | 125.29 | 64.91 | 25.13 | 44.73 |
| 1A1 | 6 | 99.02 | 53.33 | 28.56 | |
| 1AA | 1 | 4.59 | 1.41 | 2.30 | |
| 1AA | 3 | 5.62 | 4.24 | 7.68 | 6.03 |
| 1AA | 6 | 8.01 | 7.88 | 12.52 | |
| AAA | 1 | 4.69 | 0.34 | 0.68 | |
| AAA | 3 | 11.42 | 7.98 | 29.50 | 14.14 |
| AAA | 6 | 18.88 | 11.96 | 41.85 | |
| Average | - | 31.20 | 17.05 | 16.65 | |

Fig. 23

| Binarization method | Number of inducers | General Significance | Vs. Stacking | Vs StackingC |
|---|---|---|---|---|
| 1A1 | 1 | + | = | + |
| 1A1 | 3 | + | + | + |
| 1A1 | 6 | + | + | + |
| 1AA | 1 | + | + | + (91%) |
| 1AA | 3 | None | n/a | n/a |
| 1AA | 6 | + | + | + |
| AAA | 1 | None | n/a | n/a |
| AAA | 3 | + | + | = |
| AAA | 6 | + | + | = |

Fig. 24

| Class label | Instances |
|---|---|
| fourteen | 4553 |
| thirteen | 4194 |
| twelve | 3597 |
| eleven | 2854 |
| Draw | 2796 |
| fifteen | 2166 |
| ten | 1985 |
| nine | 1712 |
| eight | 1433 |
| seven | 683 |
| six | 592 |
| five | 471 |
| sixteen | 390 |
| Two | 246 |
| four | 198 |
| Three | 81 |
| One | 78 |
| Zero | 27 |

Fig. 25

| Dataset name | Contained classes |
|---|---|
| KRKOPT-2clss | Eleven, Draw |
| KRKOPT-3clss | Eleven, Draw, Fifteen |
| KRKOPT-4clss | Eleven, Draw, Fifteen, Ten |
| KRKOPT-5clss | Eleven, Draw, Fifteen, Ten, Nine |
| KRKOPT-6clss | Eleven, Draw, Fifteen, Ten, Nine, Eight |
| KRKOPT-7clss | Eleven, Draw, Fifteen, Ten, Nine, Eight, Seven |

Fig. 26

STACKING SCHEMA FOR CLASSIFICATION TASKS

FIELD OF THE INVENTION

The field of the present invention is related to data analysis and more particularly to a predictive model by integrating multiple models.

BACKGROUND OF THE INVENTION

A classifier is a classification model which assigns an unclassified instance to a predefined set of classes. The classifier may be induced by using a learning algorithm (also known as an inducer), such as C4.5 [Quinlan, R. (1993). *C4.5: "Programs for Machine Learning". Machine Learning*, 235-240.] or SVM [Boser, B. E., Guyon, I. M. & Vapnik, V. N. (1992): "A training algorithm for optimal margin classifiers", 5th Annual ACM (pp. 144-152). ACM Press, Pittsburgh, Pa.]. Ensemble methodology considers combining multiple classifiers to work collectively, in order to compensate each other's weaknesses and to generate better classifications through some kind of fusion strategy.

Meta-learning is a process of learning from learners (also called hereinafter classifiers). The training of a meta-classifier is composed of two or more stages, rather than one stage, as with standard learners. In order to induce a meta classifier, first the base classifiers are trained, and then the Meta classifier is trained. In the prediction phase, base classifiers will output their classifications, and then the Meta-classifier(s) will make the final classification (as a function of the base classifiers).

Stacking is a technique for inducing which classifiers are reliable and which are not. Stacking is usually employed to combine models built by different inducers. The idea is to create a meta-dataset containing a tuple (an ordered set of values) for each tuple in the original dataset. However, instead of using the original input attributes, it uses the classifications predicted by the classifiers as the input attributes. The target attribute remains as in the original training set. A test instance is first classified by each of the base classifiers. These classifications are fed into a meta-level training set from which a meta-classifier is produced.

This classifier (also denoted Meta-classifier) combines the different predictions into a final one. It is recommended that the original dataset should be partitioned into two subsets. The first subset is reserved to form the meta-dataset and the second subset is used to build the base-level classifiers. Consequently, the meta-classifier predications reflect the true performance of base-level learning algorithms. Stacking performance can be improved by using output probabilities for every class label from the base-level classifiers. It has been shown that with stacking, the ensemble performs (at best) comparably to selecting the best classifier from the ensemble by cross validation [Dzeroski S., Zenko B. (2004): "Is Combining Classifiers with Stacking Better than Selecting the Best One?" Machine Learning 54(3), (pp. 255-273).].

StackingC is a Stacking variation. In empirical tests Stacking showed significant performance degradation for multi-class datasets. StackingC was designed to address this problem. In StackingC, each base classifier outputs only one class probability prediction [Seewald A. K. (2003): "Towards understanding stacking—Studies of a general ensemble learning scheme", PhD-Thesis, T U Wien.]. Each base classifier is trained and tested upon one particular class while stacking output probabilities for all classes and from all component classifiers. FIGS. 1 to 4 show an illustration of Stacking and StackingC on a dataset with three classes (a, b and c), n examples, and N base classifiers. $P_{i,j,k}$ refers to the probability given by base classifier i for class j on example number k.

FIG. 1 shows an example with three classes (a, b and c), n examples, and N base classifiers. It shows the original training set with its attribute vectors and class values. FIG. 2 shows how a class probability distribution of one sensible classifier may appear. The maximum probabilities are shown in italics and denote the classes which would be predicted for each example. There is one such set of class probability distributions for each base classifier. FIG. 3 shows the Meta training set for Stacking which is used to learn a Meta classifier that predicts the probability that class=a. $P_{i,j,k}$ denotes the probability given by the base classifier i for class j on example number k. The classes are mapped to an indicator variable such that only class "a" is mapped to 1, and all other classes are mapped to 0. In this example, there are, of course, two other such training sets for class b and c which differ only in the last column and are thus not shown.

FIG. 4 shows the corresponding Meta training set for StackingC which consists only of those columns from the original meta training set which are concerned with class=$C_\alpha$, i.e., $P_{i, j, k}$ for all i, j and k. While the Meta training sets for Stacking's Meta classifier differ only in the last attribute (the class indicator variable), those for StackingC have fewer attributes by a factor equal to the number of classes and also have no common attributes. This necessarily leads to more diverse linear models, which [Seewald A. K. (2003): "Towards understanding stacking—Studies of a general ensemble learning scheme", PhD-Thesis, TU Wien.] believes to be one mechanism by which it outperforms Stacking. Another reason may simply be that with fewer attributes, the learning problem becomes easier to solve, provided only irrelevant information is removed. The dimensionality of the Meta dataset is reduced by a factor equal to the number of classes, which leads to faster learning. In comparison to other ensemble learning methods this improves Stacking's advantage further, making it the most successful system by a variety of measures.

StackingC improves on Stacking in terms of significant accuracy differences, accuracy ratios, and runtime. These improvements are more evident for multi-class datasets and have a tendency to become more pronounced as the number of classes increases. StackingC also resolves the weakness of Stacking in the extension proposed by Ting and Witten in [Ting, K. M., Witten, I. H. (1999): Issues in stacked generalization. Journal of Artificial Intelligence Research 10, pages 271-289.] and offers a balanced performance on two-class and multi-class datasets.

Seewald in [Seewald A. K. (2003): "Towards understanding stacking—Studies of a general ensemble learning scheme, PhD-Thesis, TU Wien.] has shown that all ensemble learning systems, including StackingC [Seewald, A. (2002): "How to Make Stacking Better and Faster While Also Taking Care of an Unknown Weakness", Nineteenth International Conference on Machine Learning (pp. 554-561). Sydney: Morgan Kaufmann Publishers.], Grading [Seewald A. K. and J. Fuernkranz. (2001). An Evaluation of Grading Classifiers. Advances in Intelligent Data Analysis: 4th International Conference (pp. 115-124). Berlin/Heidelberg/New York/Tokyo: Springer.] and even Bagging [Breiman, L. (1996). Bagging predictors. Machine Learning, 123-140.] can be simulated by Stacking [Wolpert, D. (1992). Stacked Generalization. Neural Networks5, 241-259. Boser, B E., Guyon, I. M. and Vapnik, V N. (1992) A training algorithm for optimal margin classifiers. In Proceedings of the 5th Annual ACM Workshop on Computational Learning Theory ACM Press, Pittsburgh, Pa., pp. 144-152.]. To do this they give functionally equivalent definitions of most schemes as Meta-classifiers for Stacking. Dzeroski and Zenko in [Dzeroski S., Zenko B. (2004). Is Combining Classifiers with Stacking Better than Selecting the Best One? Machine Learning 54(3), (pp. 255-273).] indicated that the combination of SCANN [Merz C. J, and Murphy P. M., UCI Repository of machine learning databases. Irvine, Calif.: University of California, Department of Information and Computer Science, 1998.], which is a variant of Stacking, and MDT Ting and Witten in [Ting, K. M., Witten, I. H. (1999): Issues in stacked generalization. Journal of Artificial Intelligence Research 10, pages 271-289.] plus selecting the best base classifier using cross validation (SelectBest) seems to perform at about the same level as Stacking with Multi-linear Response (MLR).

Seewald in [Seewald A. K. (2003). Towards understanding stacking—Studies of a general ensemble learning scheme. PhD-Thesis, TU Wien.] presented strong empirical evidence that Stacking in the extension proposed by Ting and Witten in [Ting, K. M., Witten, I. H. (1999): Issues in stacked generalization. Journal of Artificial Intelligence Research 10, pages 271-289.] performs worse on multi-class than on two-class datasets, for all but one meta-learner he investigated. The explanation given was that when the dataset has a higher number of classes, the dimensionality of the meta-level data is proportionally increased. This higher dimensionality makes it harder for meta-learners to induce good models, since there are more features to be considered. The increased dimensionality has two more drawbacks. First, it increases the training time of the Meta classifier; in many inducers this problem is acute. Second, it also increases the amount of memory which is used in the process of training. This may lead to insufficient resources, and therefore may limit the number of training cases (instances) from which an inducer may learn, thus damaging the accuracy of the ensemble.

During the learning phase of StackingC it is essential to use one-against-all class binarization and regression learners for each class model. This class binarization is believed to be a problematic method especially when class distribution is highly non-symmetric. It has been illustrated in [Fürnkranz, J. (2002). Pairwise Classification as an Ensemble Technique. European Conference on Machine Learning (pp. 97-110). Helsinki, Finland: Austrian Research Institute for Artificial Intelligence.] that handling many classes is a major problem for the one-against-all binarization technique, possibly because the resulting binary learning problems increasingly skewed class distributions. An alternative to one-against-all class binarization is the one-against-one binarization in which the basic idea is to convert a multiple class problem into a series of two-class problems by training one classifier for each pair of classes, using only training examples of these two classes and ignoring all others. A new example is classified by submitting it to each of the $$\frac{k(k-1)}{2}$$

binary classifiers, and combining their predictions (k, number of classes in the multiple class problem). We have found in our preliminary experiments that this binarization method yields noticeably poor accuracy results when the number of classes in the problem increases. Later, after performing a much wider and broader experiment on StackingC in conjunction with the one-against-one binarization method, we came to this same conclusion. An explanation might be that, as the number of classes in a problem increases, the greater is the chance that any of the $$\frac{k(k-1)}{2}$$

base classifiers will give a wrong prediction. There are two reasons for this. First, when predicting the class of an instance, only out of $$\frac{k(k-1)}{2}$$

classifiers may predict correctly. This is because only k−1 classifiers were trained on any specific class. We can see that as k increases, the percentage of classifiers which may classify correctly is decreasing, and will descend practically to zero:

$$\lim_{k\to\infty} \frac{k-1}{\frac{k(k-1)}{2}} = \lim_{k\to\infty} \frac{2}{k} = 0 \qquad (1)$$

The second reason is that in one-against-one binarization we use only instances of two classes—the instances of each one of the pair classes, while in one-against-all we use all instances, and thus the number of training instances for each base classifier in one-against-one binarization is much smaller than in the one-against-all binarization method. Thus using the one-against-one binarization method may yield inferior base classifier.

There are several alternatives to decompose the multiclass problem into binary subtasks. Lorena and de Carvalho in [Lorena A. and de Carvalho A. C. P. L. F.: Evolutionary Design of Code-matrices for Multiclass Problems, Soft Computing for Knowledge Discovery and Data Mining, Springer US, 153-184, 2007] survey all popular methods. The most straightforward method to convert k class classification problems into k-two class classification problems has been proposed by Anand in [Anand R, Methrotra K, Mohan C K, Ranka S. Efficient classification for multiclass problems using modular neural networks. IEEE Trans Neural Networks, 6(1): 117-125, 1995]. Each problem considers the discrimination of one class to the other classes. Lu and Ito in [Lu B. L., Ito M., Task Decomposition and Module Combination Based on Class Relations: A Modular Neural Network for Pattern Classification, IEEE Trans. on Neural Networks, 10(5):1244-1256, 1999.] extend Anand's method and propose a new method for manipulating the data based on the class relations among the training data. By using this method, they divide a k class classification problem into a series of k(k−1)/2 two-class problems where each problem considers the discrimination of one class to each one of the other classes. The researchers used neural networks to examine this idea. A general concept aggregation algorithm called Error-Correcting Output Coding (ECOC) uses a code matrix to decompose a multi-class problem into multiple binary problems [Dietterich, T. G., and Ghulum Bakiri. Solving multi-class learning problems via error-correcting output codes. Journal of Artificial Intelligence Research, 2:263-286, 1995.]. ECOC for multi-class classification hinges on the design of the code matrix.

Sivalingam et al. in [Sivalingam D., Pandian N., Ben-Arie J., Minimal Classification Method With Error-Correcting Codes For Multiclass Recognition, International Journal of Pattern Recognition and Artificial Intelligence 19(5): 663-680, 2005.] propose to transform a multiclass recognition problem into a minimal binary classification problem using the Minimal Classification Method (MCM) aided with error correcting codes. The MCM requires only $\log_2 k$ classifications because instead of separating only two classes at each classification, this method separate two groups of multiple classes. Thus the MCM requires small number of classifiers and still provide similar accuracy performance.

Data-driven Error Correcting Output Coding (DECOC) [Zhoua J., Pengb H., Suenc C., Data-driven decomposition for multi-class classification, Pattern Recognition 41: 67-76, 2008.] explores the distribution of data classes and optimizes both the composition and the number of base learners to design an effective and compact code matrix. Specifically, DECOC calculate the confidence score of each base classifier based on the structural information of the training data and use sorted confidence scores to assist the determination of code matrix of ECOC. The results show that the proposed DECOC is able to deliver competitive accuracy compared with other ECOC methods, using parsimonious base learners than the pairwise coupling (one vs. one) decomposition scheme.

It should be noted that finding new methods for converting multiclass classification problems into binary classification problems is not one of the goals of this paper. Still, we are using in our experimental study three different methods for this conversion.

It is therefore a purpose of the present invention to provide a method and a system overcoming the limitations of the existing approaches.

It is another purpose of the present invention to provide a method and a system allowing efficient classification and prediction of dataset values.

It is yet another purpose of the present invention to provide a method and a system for performing efficient predictions based on data classification.

Further purposes and advantages of this invention will appear as the description proceeds.

SUMMARY OF THE INVENTION

The present invention is directed to a method for improving stacking schema for classification tasks, according to which predictive models are built, based on stacked-generalization meta-classifiers. Classifications are combined to build a new scheme from at least two layers and multiclass classification problems are converted into binary classification problems. One-against-all class binarization and regression learners are used for each class model and ensemble classifiers are improved using stacking. Accuracy differences, accuracy ratio, and runtime classification in multiclass datasets are also improved and the class of a value is then predicted.

The method may combine base classifiers in the first stage, during which, all base classifiers using specialist classifiers are combined. The specialist classifier may be based on dichotomous models.

An output may be a probability value, which is an input instance that belongs to a particular class. Meta-classifiers may be used during the second stage. The layer may learn the prediction characteristics of a specialist classifier, which may use at least two meta-classifiers that are combined.

Each meta-classifier may be in charge of one class only. The meta-classifiers may be trained in one-against-all fashion. All the specialist classifiers may be able to classify its own class. During the third stage, a super classifier layer may be used, while producing a final prediction model.

The inputs of the super classifier may be the outputs of the meta-classifiers.

The super classifier may learn the conditions in which at least one meta classifier predicts correctly or incorrectly, and may output a vector of probability being the final produced decision.

The present invention is also directed to a system for improving stacking schema for classification tasks, that comprises a set of distinguishable layers of continuing classifiers that are being arranged in a tandem-like order. Only one layer of combining classifiers may be used. The outputs of a layer of classifiers may be the inputs of other layers and may be prediction values.

A set of prediction inputs may be combined to generate a new prediction output. A set of prediction inputs may be combined to generate a final prediction output.

All the above and other characteristics and advantages of the invention will be further understood through the following illustrative and non-limitative description of preferred embodiments thereof, with reference to the appended drawings; wherein like components are designated by the same reference numerals.

BRIEF DESCRIPTION OF THE DRAWINGS

FIG. 1 shows a table of the original training-set;

FIG. 2 shows a table of a sample class probability distribution;

FIG. 3 shows a table a Meta training set, Stacking;

FIG. 4 shows a table a Meta training set for $class_a$, StackingC;

FIG. 7 shows an example of a pseudo-code of the main function of Troika;

FIG. 8 shows an example of a pseudo-Code of Train Single Layer Function Called by the Main Procedure/Function;

FIG. 9 shows the Troika's Specialist dataset for classes i and j;

FIG. 10 shows the Troika's Meta dataset for class m;

FIG. 11 shows the Troika's Super dataset;

FIG. 12 shows an Experimental Datasets;

FIG. 13 shows the composition of $train-set_1$ and $train-set_2$ where given an arbitrary train-set, which contains 100 instances;

FIG. 14 shows a table comparing ensemble algorithms using 6 inducers: C4.5 (Trees), PART (rules), VFI (misc.), IBk (Lazy), Bayes-Net (Bayes), SMO (functions);

FIG. 15 shows a table comparing ensemble algorithms using 3 inducers: C4.5 (Trees), VFI (misc.), IBk (Lazy);

FIG. 16 shows a table comparing ensemble algorithms using one inducer, C4.5, summary of experimental results for UCI repository datasets;

FIG. 21 shows a table of the mean accuracy of all assembly methods;

FIG. 22 shows a table of the mean AUC (area under ROC) for all assembly methods;

FIG. 23 shows a table of the mean execution time for all assembly methods;

FIG. 24 shows a table of the summary of statistical significance of the difference between accuracy performances of the three ensemble methods;

FIG. 25 shows a table of the original KRKOPT dataset instance distribution;

FIG. 26 shows a table of the Six KRKOPT derived datasets;

DETAILED DESCRIPTION OF PREFERRED EMBODIMENTS

Figure 5:
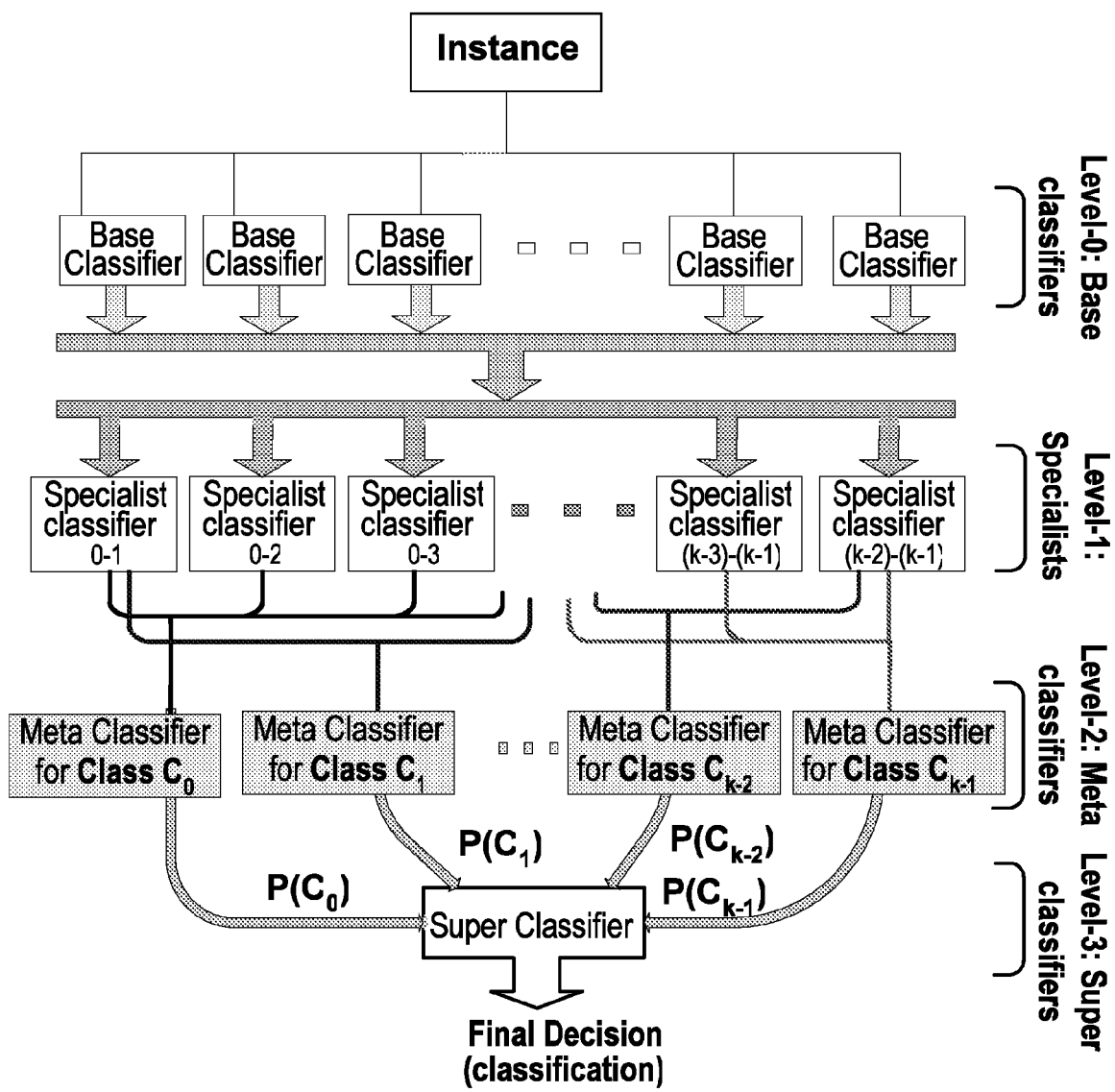
FIG. 5 shows the Troika architecture—showing three layers of combiners ($level_1$ to $level_3$) and a base classifier level ($level_0$)

The idea of ensemble methodology, disclosed in the present invention, is to build a predictive model by integrating multiple models. It is well-known that ensemble methods can be used for improving prediction performance. Researchers from various disciplines such as statistics, machine learning, pattern recognition, and data mining have considered the use of ensemble methodology. Stacking is a general ensemble method in which a number of base classifiers are combined using one meta-classifier which learns theirs outputs. The advantage of stacking is that it is simple, in most cases performs similar to the best classifier, and it is capable to combine classifiers induced by different inducers. The disadvantage of stacking is that it seems to perform worse on multiclass problems. In the present invention, a new method (named Troika) for improving ensemble classifiers using stacking is disclosed. The new scheme is built from three layers of combining classifiers. The new method was tested on various datasets and the results indicate the superiority of the proposed method to other legacy ensemble schemes, Stacking and StackingC, especially when the classification task consists of more than two classes.

Troika, is designed to address the Stacking and StackingC problems described above. Troika's ensemble scheme is general purpose and can be used to combine any type of base classifiers which were trained on any subgroup of possible classes of a problem's domain. In other words, it is possible with Troika to combine models (base classifiers) that were trained on, and therefore may later predict, non congruent datasets, in terms of instance classes.

The main idea of Troika is to combine base classifier in three stages. In the first stage it will combine all base classifiers (sometimes refer to as Level-0 or base layer) using specialist classifiers. The specialists are classifiers which have a dichotomous model (a one-against-one binarization); each specialist's (specialist classifier) task is to distinguish between pairs of classes from the problem domain, and no two specialists are alike, i.e., each specialist is specialized in distinguishing between different pairs of classes. We will use the notation Sp$i$-$j$ to indicate the specialist $\langle i,j\rangle$. Sp$i$-$j$'s task is to classify whether an input instance belongs to class$i$ or to class$j$. Let k be the number of classes in a problem domain, $i=\{0 \ldots k-2\}$ and $j=\{i+1 \ldots k-1\}$. The exact specialist classifiers number equals $$\binom{2}{k},$$

where k is the number of classes in the problem domain. A specialist classifier output, P$inst$,$i$-$j$, is the computed probability that an input instance, inst, belongs to class$i$ (wherein Input instance inst has a computed probability (1-P$inst$,$i$-$j$) of belonging to class$j$). Given an instance inst belonging to class i or class j, we will expect Sp$i$-$j$ to predict the inst class correctly most of the time. Conversely, when inst real class is not i or j the output of Sp$i$-$j$ will certainly be faulty in an unpredicted way. For example, Sp2-5 indicates specialist2-5 which may distinguish between class2 and class5. If an instance inst of class0 is given to Sp2-5, we cannot make a preliminary assumption about Sp2-5's output (because in the training phase Sp2-5 had been given only instances of class2 and class5). This is why we need to learn the characteristics and patterns of the behavior of specialists to be able to predict when specialists are correct and when they are not. This is exactly what is done in the next stage, the meta-classifier layer.

The second stage is the meta-classifiers layer. This layer's task is to learn the prediction characteristics of the specialist classifiers. The method used to accomplish this task is to combine the specialist classifiers using k meta-classifiers. Each meta-classifier is in charge of one class only, and will combine all the specialist classifiers which are able to classify its own class; meta-classifier$_m$ (m=$\{0 \ldots k-1\}$) will combine all specialists Sp$_{i-j}$ whose i=m or j=m. The meta-classifier will compute a probability P$_{inst,c}$ as an output. P$_{inst,c}$ stands for the computed probability that a given input instance inst belongs to class$_c$ (c=$\{0 \ldots k-1\}$). The meta-classifiers are trained in a one-against-all fashion, rather than one-against-one as with specialist classifiers. We will explain the logic behind this choice later.

The third stage is the super classifier layer. This layer contains only one classifier: the super classifier. The goal of this stage is to produce Troika's final prediction. The inputs of the super classifier are the outputs P$_{inst,c}$ produced by the meta classifiers in the previous stage. In the training phase, the Super classifier learns the conditions in which one or more of the meta-classifiers predict correctly or incorrectly. The super classifier's output is a vector of probabilities (one value for each class) which forms the final decision of the Troika ensemble scheme.

FIG. 5 presents the schematic of the Troika ensemble's architecture. Troika uses three distinguishable layers of combining classifiers, and is arranged in a tandem-like order. An instance of a problem's domain feeds the layer$_0$ classifiers (base classifiers). Layer$_0$ classifiers will output their predictions to layer$_1$'s inputs. Classifiers on layer$_1$ (specialists classifiers) will combine layer$_0$'s classifiers, and then feed their predictions to layer$_2$ inputs. Layer$_2$ classifiers (meta-classifiers) in their turn, will combine layer$_1$'s classifiers predictions and feed their own predictions to layer$_3$ inputs. The layer$_3$ classifier (super classifier) will combine layer$_2$'s predictions, and ultimately, produce a final prediction.

A new ensemble methodology, Troika, is designed to address the Stacking and StackingC problems described above. Troika's ensemble scheme is general purpose and can be used to combine any type of base classifiers which were trained on any subgroup of possible classes of a problem's domain. In other words, it is possible with Troika to combine models (base classifiers) that were trained on, and therefore may later predict, non congruent datasets, in terms of instances classes.

The main idea of Troika is to combine base classifier in three stages. In the first stage it will combine all base classifiers (Sometimes refer to as Level-0 or base layer) using specialist classifiers. The specialists are classifiers which have a dichotomous model (a one-against-one binarization); each specialist's (specialist classifier) task is to distinguish between pairs of classes from the problem domain, and no two specialists are alike, i.e., each specialist is specialized in distinguishing between different pairs of classes. We will use the notation $Sp_{i-j}$ to indicate the specialist $<i,j>$. $Sp_{i-j}$'s task is to classify whether an input instance belongs to $class_i$ or to $class_j$. Let k be the number of classes in a problem domain, $i=\{0 \ldots k-2\}$ and $j=\{i+1 \ldots k-1\}$. The exact specialist classifiers number equals $$\binom{2}{k},$$

where k is the number of classes in the problem domain. A specialist classifier output, $P_{inst,i-j}$, is the computed probability that an input instance, inst, belongs to $class_i$ (Input instance inst has a computed probability $(1-P_{inst,i-j})$ of belonging to $class_j$). Given an instance inst belonging to $class_i$ or $class_j$, we will expect $Sp_{i-j}$ to predict the inst class correctly most of the time. Conversely, when inst real class is not i or j the output of $Sp_{i-j}$ will certainly be faulty in an unpredicted way. For example, $Sp_{2-5}$ indicates $specialist_{2-5}$ which may distinguish between $class_2$ and $class_5$. If an instance inst of $class_0$ is given to $Sp_{2-5}$, we cannot make a preliminary assumption about $Sp_{2-5}$'s output (because in the training phase $Sp_{2-5}$ had been given only instances of $class_2$ and $class_5$). This is why we need to learn the characteristics and patterns of the behavior of specialists to be able to predict when specialists are correct and when they are not. This is exactly what is done in the next stage, the meta-classifier layer.

The second stage is the meta-classifiers layer. This layer's task is to learn the prediction characteristics of the specialist classifiers. The method used to accomplish this task is to combine the specialist classifiers using k meta-classifiers. Each meta-classifier is in charge of one class only, and will combine all the specialist classifiers which are able to classify its own class; meta-$classifier_m$ ($m=\{0 \ldots k-1\}$) will combine all specialists $Sp_{i-j}$ whose $i=m$ or $j=m$. The meta-classifier will compute a probability $P_{inst,c}$ as an output. $P_{inst,c}$ stands for the computed probability that a given input instance inst belongs to $class_c$ ($c=\{0 \ldots k-1\}$). The meta-classifiers are trained in a one-against-all fashion, rather than one-against-one as with specialist classifiers. We will explain the logic behind this choice later.

The third stage is the super classifier layer. This layer contains only one classifier: the super classifier. The goal of this stage is to produce Troika's final prediction. The inputs of the super classifier are the outputs $P_{inst,c}$ produced by the meta classifiers in the previous stage. In the training phase, the Super classifier learns the conditions in which one or more of the meta-classifiers predict correctly or incorrectly. The super classifier's output is a vector of probabilities (one value for each class) which forms the final decision of the Troika ensemble scheme.

Before one is able to use Troika to classify a new problem's instances, Troika, (and therefore all of its three combining layers of classifiers) must be trained. FIGS. 7 and 8 present the proposed procedure. The most straightforward way of doing this is to train one layer of classifiers at a time. This leads to a training process which takes place in a sequence consisting of four stages. At any one stage, a different layer of classifiers will be trained. Since $layer_3$ depends on $layer_2$, $layer_2$ depends on $layer_1$ and $layer_1$ depend on $layer_0$, it is necessary first to train $layer_0$, then $layer_1$, followed by $layer_2$ and lastly $layer_3$.

Each layer is trained using a different dataset; first, $layer_0$ dataset is derived from the original dataset which was supplied to Troika as input; $layer_1$ dataset will be generated using predictions of $layer_0$ classifiers; $layer_2$ dataset will be generated using predictions of $level_1$ classifiers, and, finally, $level_3$ dataset will be generated using predictions of $level_2$ classifiers. The technique of generating a derived dataset using predictions of classifiers will be discussed later.

Each layer is trained in a k-fold cross validation method. The process of training each layer (except for $layer_3$) is as follows: first, the layer's dataset is split into training set and test-set. Next, a layer's classifiers will be built using the layer's training set. Finally, the successor layer's dataset will be produced by applying test set instances on the layer's classifier. Each test set instance fed to layer's classifiers will yield predictions. These predictions will be assembled to form a new instance for the successor dataset. A cross-validation fold is completed when the generating of successor instances from all the test-set's instances is finished. On the next fold, the new produced successor's dataset instances will be added to those of the previous fold. By the end of k folds, the successor layer's dataset will contain exactly the same amount of instances as the present layer's dataset.

Initially, a dataset is given as input for Troika (denoted as original-dataset in FIG. 7 and FIG. 8). The second dataset, the specialist dataset, will be derived from the base-classifiers' predictions on the $level_0$ test set. In this way, the training set is divided into k disjoint sets; k−1 sets will be joined together to form the training set, and the last set will be used as a test set.

We will use this test set to produce new instances for the successor layer, or, in the case of the last layer which has no successor, to test and validate Troika. When each fold is finished, a new fold will be commenced until a total of k folds had been made. In each fold, a different set will be selected to serve as a test set.

There are four kinds of instance in Troika. The first type is the original training set. The second kind is the specialists' instances. These are derived from the base classifiers' predictions. The third kind of instance is the meta-classifiers' instances. These instances are derived from the specialists' predictions. The last kind of instance is the super classifier instance. These instances are derived from meta-classifiers predictions.

Given l is the number of base classifiers and k is the number of classes in the problem domain, each base classifier output vector, $BC_l$, can be presented as: $BC_l = \{P(C_0), P(C_0), \ldots, P(C_k)\}$. From these vectors, we produce the specialists' instances.

In general, specialist classifier, $Sp_{i-j}$, instances are composed using the probabilities $P(C_i)$ and $P(C_j)$ of each $BC_l$. It may be possible also that one or more $BC_l$ will not contain $P(C_i)$ or $P(C_j)$ or both. FIG. 9 presents the derived dataset of $Sp_{i-j}$.

In Stacking, each example k (instance number k) of a Stacking meta-level dataset contains all, $P_{l,j,k}$ (wherein $P_{l,j,k}$ refers to the probability given by base classifier l for class j on example number k), produced by l base classifier's for all j classes in the problem domain; there are therefore j*l*k fields to the meta-classifier dataset. On the other hand, in Troika each example k of $Sp_{i-j}$ dataset contains two values per base classifier, $P(C_i)$ and $P(C_j)$; there are therefore 2*l*k fields to a specialist dataset.

The reduction of dimensionality in Troika's first combining layer's dataset compared to the Stacking meta-level dataset is:

$$r = \frac{\text{Specialist\_dataset\_volume}}{\text{stacking\_meta\_level\_dataset - volume}} = \frac{2*l*k}{j*l*k} = \frac{2}{j} \quad (2)$$

We can see that as j, the number of base classifiers in the ensemble increases, the Stacking meta-level dataset has a quadric increase in volume while Troika has a only a linear increase. This is a big advantage for Troika, because it makes it possible to combine a very large group of base classifiers without being caught in the dimensionality course. In our experiments we used Troika and Stacking to combine as many as 3900 base classifiers (with letter dataset); Troika showed a clear advantage in terms of accuracy. We suspect that the reason for Troika's triumph in this case derives from the huge dimensions (dimensionality course) of the meta-level dataset, making it hard for the Stacking meta-classifier to produce a good model. This weakness of Stacking had been shown in several previous studies and again in this study.

Given that each pair of classes i and j have a dedicated $sp_{i-j}$, and k is the number of classes in the problem domain, there are some $$\binom{2}{k}$$

specialist classifiers in Troika. Each specialist classifier outputs a single prediction, $P_{i-j}$ (inst), which stands for the probability, which was computed by $Sp_{i-j}$, that a specialist instance, inst, is of class i.

Troika has exactly k meta-classifiers, where k denotes the number of classes in the problem domain. Each meta-classifier has a different dataset that derives from a different projection of the output predictions of the specialists. Each meta dataset has one instance for each instance in the dataset which was given as an input to Troika. The meta-classifiers are trained using one-against-all binarization; for each meta instance, if the corresponding instance in the input dataset is of class Cm, then its class attribute is positive. Otherwise, the meta instance class attribute is negative. The attributes of each meta-classifier (meta-classifier$_m$ in general) instances are the probabilities $P_{i-j}$ (inst) produced by all specialist, $Sp_{i-j}$, where which j equals m; there are therefore always k attributes for each meta-classifier instance (not including the class attribute). The volume of each meta dataset can be computed as follows:

$$V_{meta-dataset} = (k+1)*n \quad (3)$$

where k is the number of classes in the problem's domain and n is the number of instances in the original dataset.

Comparing Troika's meta-datasets to a Stacking dataset is a rather tricky business, and depends on two major factors: the number of classes in the problem's domain and the number of base classifiers. The Stacking meta dataset is a function of the number of base classifiers. On the other hand, Troika's meta dataset is a function of the number of classes in the domain's problem. Our experience with the tested UCI datasets, shows that Troika's meta datasets tend to be much smaller than Stacking meta datasets.

StackingC's dataset volume is a function of the number of base classifiers. Each base classifier contributes one attribute to a meta instance; therefore, when an ensemble contains a large number of base classifiers (more than a few thousand), even though a much smaller one than Stacking meta dataset, StackingC's dataset can grow to such an enormous size that it can no longer be used for training the meta-classifier. Troika, on the other hand, is much less sensitive to the number of base classifiers because each specialist is trained using the one-against-one binarization method. Conversely, Troika is more sensitive than StackingC to the number of classes in a domain's problem, in terms of training time. This is due to the amount of specialists that need to be trained:

$$\frac{k(k-1)}{2}$$

(which yields time complexity of $O(k)^2$ for first combining layer) versus k meta-classifiers in StackingC (which yields time complexity of $O(k)$).

Given a meta-instance, each Troika meta-classifier$_j$ (j={1 ... k}) outputs a prediction, $P_j$(inst), which reflects the belonging of the meta-instance, inst, to class $C_j$ (therefore also the belonging of the original instance to that same class). It might be thought that each meta-classifier is responsible for the prediction for a single class; meta-classifier$_0$ is responsible for predicting the belonging of the input original instance to class$_0$. Meta-classifier$_1$ is responsible for predicting the belonging of the input original instance to class$_1$ etc.

A vector of all meta-classifier predictions forms the super-instance:

$$\text{SuperInstance} = \{p_0(\text{inst}), p_1(\text{inst}), \ldots, p_k(\text{inst}), \text{Class})\} \quad (4)$$

Each instance in the super-dataset has a corresponding instance in the original dataset. The class attribute of the super dataset is copied from the corresponding instance of the original dataset without any changes. FIG. 11 shows the super dataset structure.

When a new instance, x, is input to Troika, firstly, it will be fed to all of the base-classifiers. Each base classifier will then process the given instance and produce their predictions, from which a specialist instance will be generated. $Sp_{i,j}$ inst={$P_{i,j}$(x)|all base classifiers that were trained on classes i and j}. Next, each specialist, $Sp_{i-j}$, will classify its unique instance, $Sp_{i-j}$inst, (which derives directly from the base classifiers predictions) and produces a prediction $P_{i,j}$(inst$_{i-j}$); From these predictions k meta-instances, Meta-inst$_j$ (j=0 ... k) will be created; one for each of the meta-classifiers. Each meta-classifier$_i$, will then output its prediction, Pmeta$_i$(Meta-inst$_j$) and from these predictions will generate a super classifier instance, inst$_{super}$={Pmeta$_0$(inst$_j$), Pmeta$_1$(inst$_j$), ..., Pmeta$_k$(inst$_j$)} This single instance will be fed to the super classifier, which in return will produce its prediction, Troika's final prediction $$\text{FinalDecision}(x) = \{P(C_1|x), P(C_2|x), \ldots, P(C_K|x)\} \quad (5)$$

Hereinafter, we will specify the conditions in which Troika had been tested. Our goal was to create a ground on which Troika could be correctly compared to Stacking and StackingC. We start with short overview on the datasets we used, the algorithms we implemented (Troika, Stacking and StackingC), how we trained each of them and what metrics we had used to measure the performance of the ensemble schemes. Next, we will display and review the results of the experiments in details.

The goal of our experiment was to measure the success of each one of the three ensemble methods (Troika, Stacking and StackingC) when applied to various problems.

The experiment had stretched into three dimensions. The first dimension was the number of inducers that were used to create the base classifiers upon which all the ensemble methods rely. The second was the different datasets, and the third dimension was the ensemble methods, of which we had three: Stacking, StackingC and Troika.

For the experiment to be valid, we had to split the training phase into two stages: first stage composed of base-classifiers training; in the second stage we had trained the ensembles, which got the base-classifiers from first stage as input. This means that all ensemble methods have been given the same base classifiers as input, therefore a valid comparison could successfully be made. This experiment could be given the title—which ensemble will combine the base-classifiers better?

In total, we have used 29 different datasets in all the experiments; all of which were manually selected from the UCI repository [Merz C. J, and Murphy P. M., UCI Repository of machine learning databases. Irvine, Calif.: University of California, Department of Information and Computer Science, 1998.] and are widely used by the pattern recognition community for evaluating learning algorithms. The datasets vary across such dimensions as the number of target classes, of instances, of input features and their type (nominal, numeric).

The examined ensemble schemes—Troika, Stacking and StackingC were implemented in WEKA [Witten I. H. and Frank E. (2005) "Data Mining: Practical machine learning tools and techniques", 2nd Edition, Morgan Kaufmann, San Francisco, 2005.] in JAVA programming language.

All classifiers in Troika, Stacking and StackingC which participate in combining the base-classifiers, i.e., the Specialist classifiers, Meta classifiers and the Super classifier (in Troika) and meta classifiers (in Stacking and StackingC) where induced using Logistic algorithm. We have chosen this particular algorithm after trying various alternative inducers.

First, we used multiple inducers of different branches of the machine-learning theory. Generally, we intended to use only six inducers, C4.5 (trees), SMO (function), IB1 (lazy), VFI (Misc.), BayesNet (Bayes), PART (Rules), but we tested also other configurations: three inducers (C4.5, IB1 and VFI) and one inducer (C4.5).

Second, All base classifiers were trained using the one-against-one binarization method in which, typically, $$\frac{k(k-1)}{2}$$

base classifiers are trained; that is one classifier for each pair of classes. Secondly, instead of training a solely single base-classifier for each pair of classes, we actually trained two, each with difference training instances. Train-set$_1$ (the train-set of first base-classifier, which derives from the train-set) contained the first 125% of the instances in a cyclic manner (that is, the next instance past the last is the first again), whereas train-set$_2$ contains the next 125% group of the instances in the same cyclic manner (wherein First train-set$_2$ instance is next instance after the last instance of train-set$_1$). In this manner, we actually trained k(k−1) base-classifiers for each inducer.

Later on, we suspected that it could be that our choice of training the base-classifiers using one-against-one binarization method might have been the prime reason why Troika preformed better than its rivals, so we repeated the experiment using one-against-all binarization and non-binarization methods. Later, in FIGS. 21, 22, and 23 we show those experiments results.

In this experiment the following metrics were measured:

Accuracy: Accuracy is the rate of correct (incorrect) predictions made by a model over a data set. In order to estimate the generalized accuracy, a 10-fold cross-validation procedure was repeated 5 times. For each 10-fold cross-validation, the training set was randomly partitioned into 10 disjoint instance subsets. Each subset was utilized once in a test set and nine times in a training set. The same cross-validation folds were implemented for all algorithms. Since the mean accuracy is a random variable, the confidence interval was estimated by using the normal approximation of the binomial distribution. Furthermore, the one-tailed paired t-test with a confidence level of 95% verified whether the differences in accuracy between the Troika algorithm and the other algorithms were statistically significant. In order to conclude which algorithm performs best over multiple datasets, we followed the procedure proposed in [Demsar J., Statistical comparisons of classifiers over multiple data sets, J. Mach. Learn. Res. 7 (2006) 1-30.]. In the case of multiple classifiers we first used the adjusted Friedman test in order to reject the null hypothesis and then the Bonferroni-Dunn test to examine whether the new algorithm performs significantly better than existing algorithms.

Area under ROC curve: The second measure we used to evaluate Troika is the Area under the ROC (Receiver Operating Characteristic) curve, a graphical plot of the sensitivity vs. (1-specificity) for a binary classifier system as its discrimination threshold is varied. The ROC can also be represented equivalently by plotting the fraction of true positives (TPR=true positive rate) vs. the fraction of false positives (FPR=false positive rate). ROC analysis provides tools to select possibly optimal models and to discard suboptimal ones independently from (and prior to specifying) the cost context or the class distribution. ROC analysis is related in a direct and natural way to cost/benefit analysis of diagnostic decision making. Widely used in medicine, radiology, psychology and other areas for many decades, it has been introduced relatively recently in other areas such as machine learning and data mining.

Training time: This measure is an applicative one. It has two significances; first, and most logical, heavy time consumption is bad. We would prefer a fast learning ensemble that will yield the best accuracy or area under ROC. Second, the longer time the training of an ensemble takes, the more CPU time it requires, and thus, the more energy it consumes. This is very important on mobile platforms that may be using an ensemble for various reasons.

Since the accuracy and the classifier complexity are affected by the ensemble size (number of classifiers), we examined three ensemble configurations: six, three, and one inducers. The size of the whole ensemble, $n_{en}$, can be described in the next equation:

$$n_{en} = n_{ind} * k(k-1) \tag{7}$$

where $n_{ind}$ is the number of inducers and k is the number of classes in dataset. For example, the size of Troika ensembles on 'letter' dataset, which contains 26 classes is $n_{en}=6*26(26-1)=3900$ when six inducers are been used, 1950 and 975 inducer for three and one inducers respectively.

Figure 6:
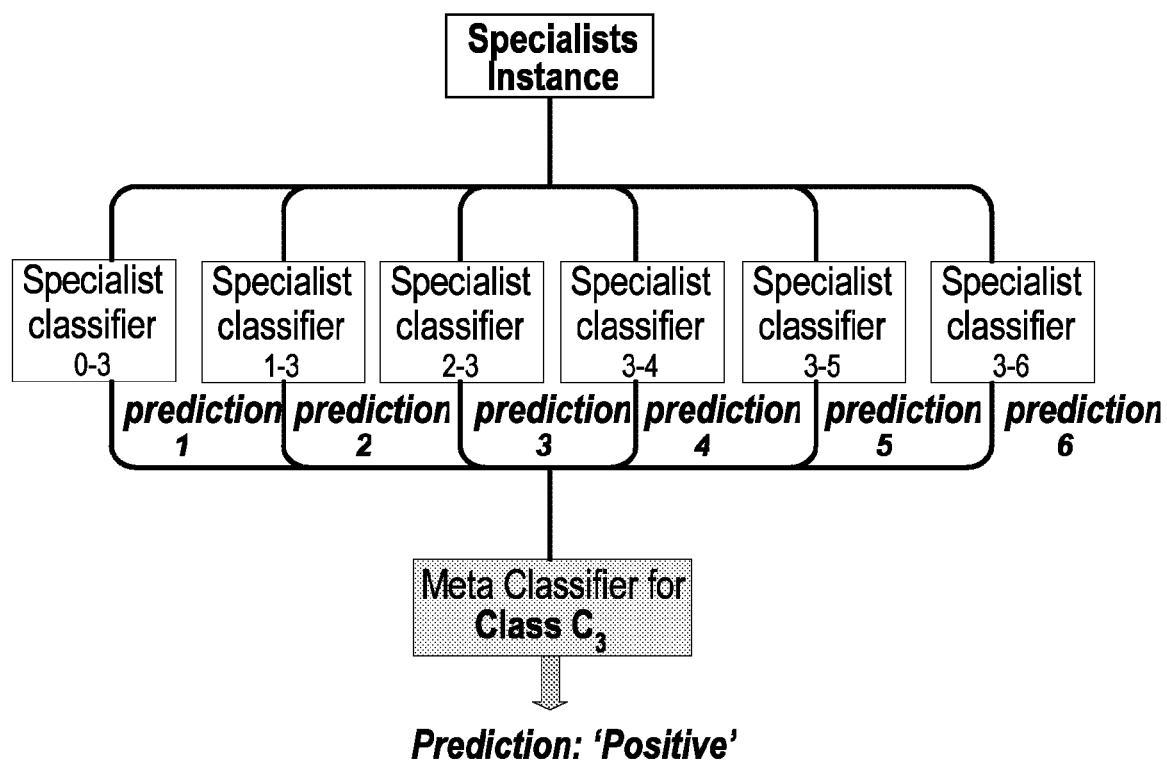
FIG. 6 show a schematic view of Meta classifier for class $C_3$.
Figure 17:
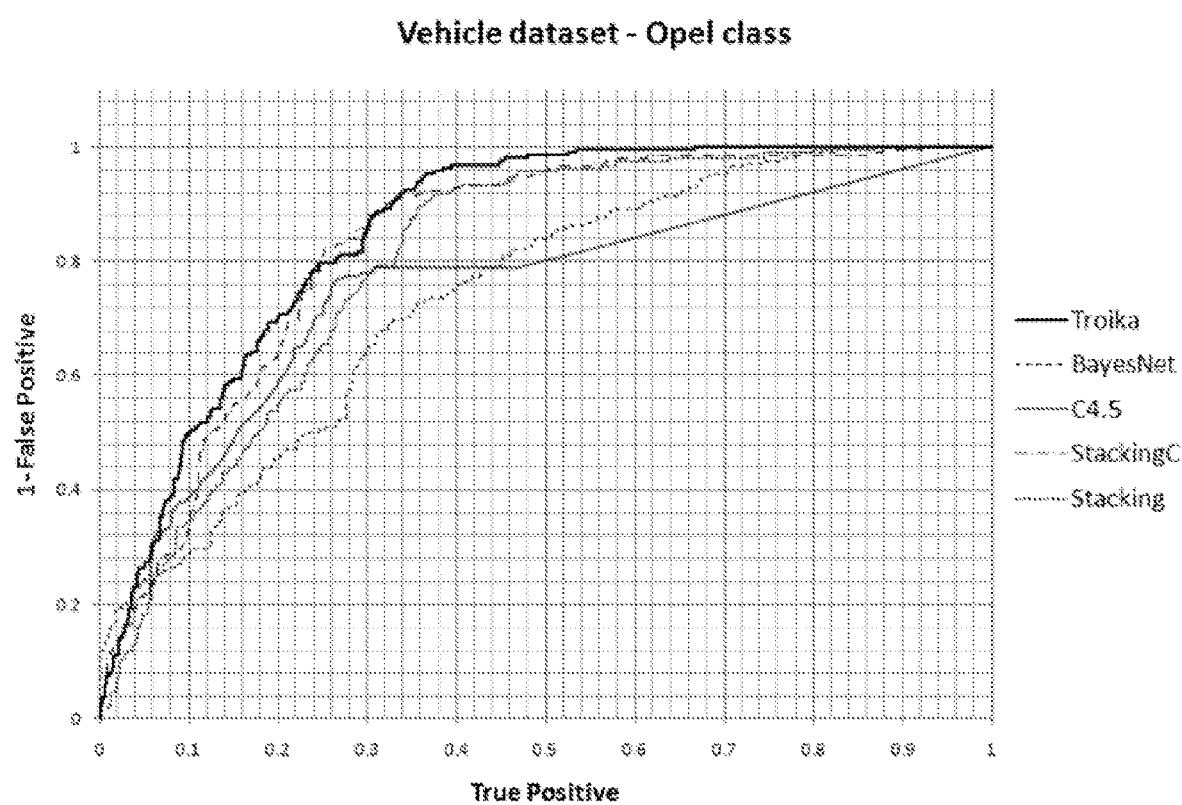
FIG. 17 shows a ROC graph for "Opel" class. It can be seen that Troika, in the strong line, excels its opponents in almost every segments of the graph.
Figure 18:
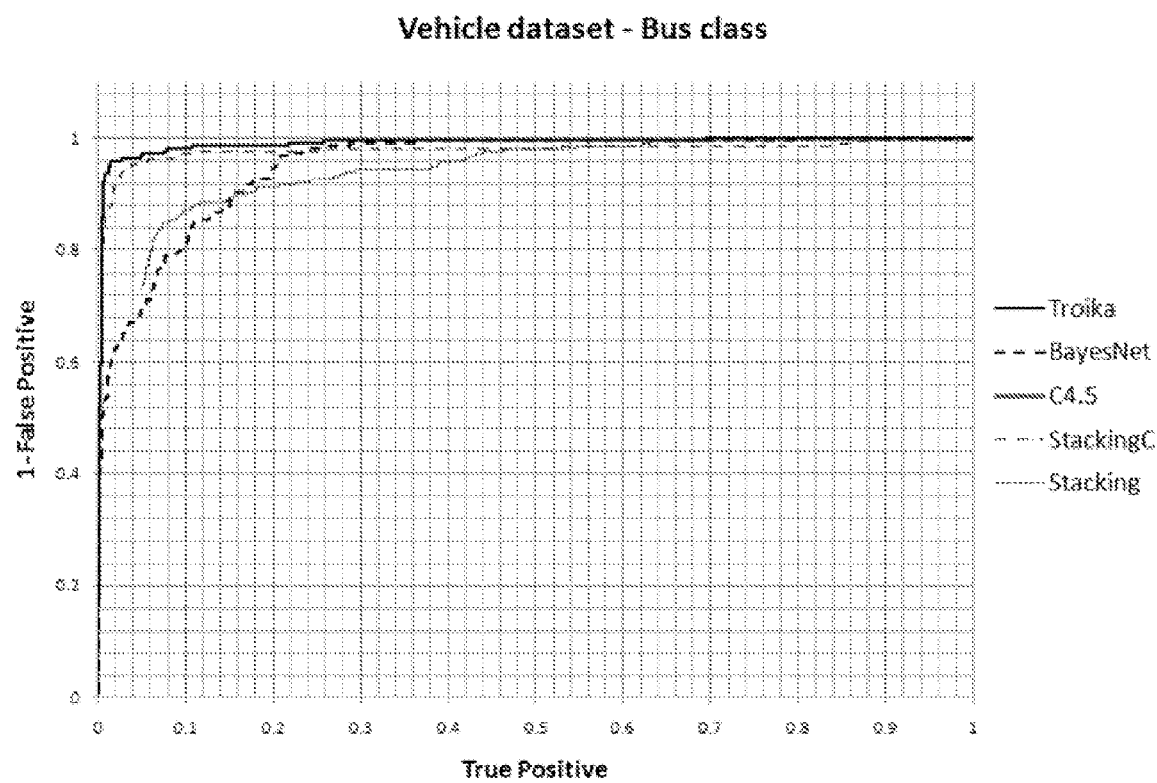
FIG. 18 shows a ROC graph for "Bus" class.
Figure 19:
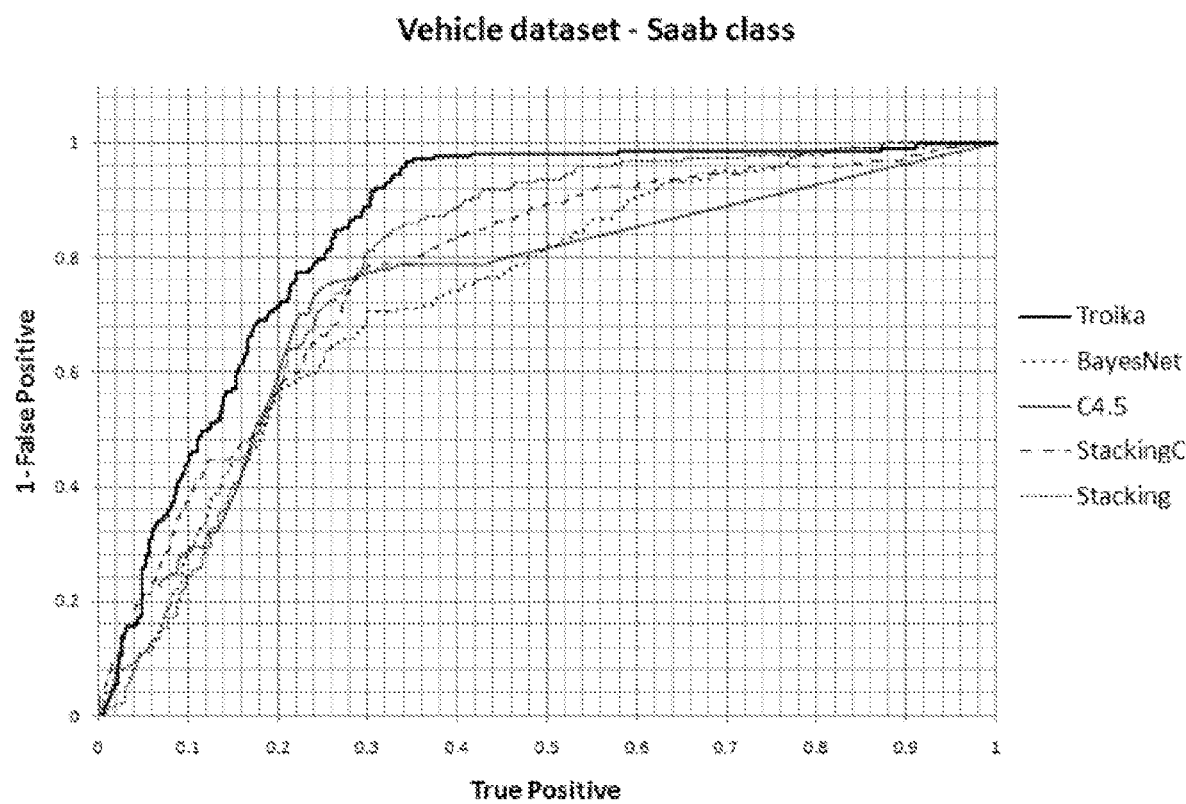
FIG. 19 shows a ROC graph for "Saab" class.
Figure 20:
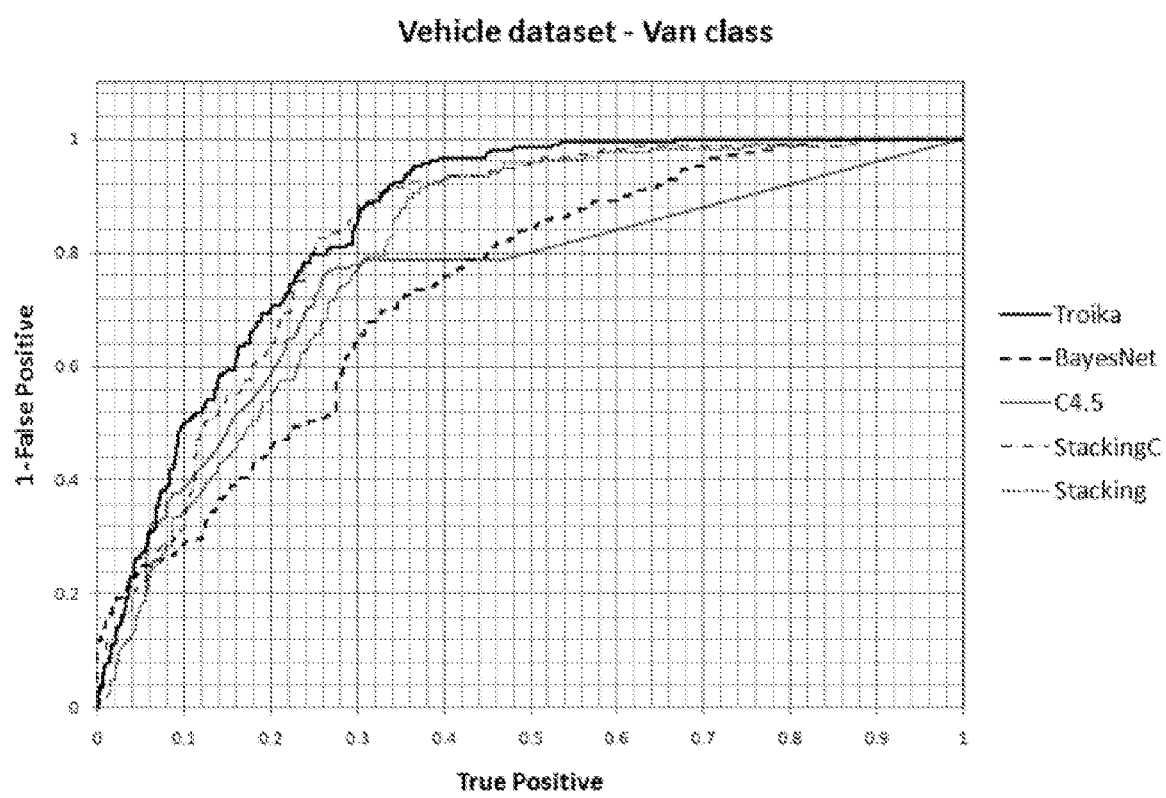
FIG. 20 shows a ROC graph for "Van" class.

FIGS. 15, 15, and 16 present the results obtained using different number of inducers using the 10-fold cross-validation procedure which was repeated five times and one-against-one binarization method. The superscript "+" indicates that the degree of accuracy of Troika was significantly higher than the corresponding algorithm at a confidence level of 95%. The "−" superscript indicates the accuracy was significantly lower. In Table 10 we used six inducers (C4.5, PART, VFI, IBk, Bayes-Net and SMO) for creating base classifiers, in FIG. 15 we used three inducers (C4.5, VFI, IBk) and finally in FIG. 16 we used only one inducer (C4.5). The reason why we repeat all the testing three times with different amount of inducers is to investigate the effect of inducer number on ensemble performance. In FIGS. 6, 7 and 8 "Best B. C." stands for best base classifier chosen by cross validation.

As can be seen from FIG. 14, the mean predictive accuracy on UCI datasets of Troika excels Stacking and StackingC. It also excels the mean accuracy of the best base-classifier selected by X-VAL (cross validation). Stacking is second best, and last is StackingC.

There are few datasets in which the Troika obtained a degree of accuracy lower to that of Stacking and StackingC, but none are significant. There are no cases in which Stacking or StackingC achieved much higher degrees of accuracy, but on the contrary, there are cases in which Troika achieved much higher accurate results compare to the other two ensemble methods (Sonar, Splice, Glass, Flag, Vowel, and KRKOPT (FIG. 25)).

A statistical analysis of the accuracy results on the entire dataset collection indicates that
(1) in five datasets Stacking achieved significantly lower accuracy compare to Troika's;
(2) in none of the datasets Stacking excels Troika;
(3) in nine datasets StackingC achieved significantly lower accuracy compare to Troika's; and
(4) in none of the datasets StackingC excels Troika.

A statistical analysis of the Area under ROC curve results of the entire dataset collection indicates that
(1) Stacking and StackingC achieved significantly lower results compare to Troika in two datasets; and
(2) Stacking and StackingC were better than Troika in one dataset.

Although mean execution time of Troika is longer than stackingC and shorter than of Stacking, adjusted non-parametric Friedman test with a confidence level of 95% shows that those differences are not significant.

The null-hypothesis that all ensemble methods perform the same using six inducers was rejected using the adjusted non-parametric Friedman test with a confidence level of 95%. Using the Bonferroni-Dunn test we could reject the null-hypothesis that Troika and Stacking perform the same at confidence levels of 93.4%. Using same test we could also reject the hypothesis that Troika and StackingC performs the same at confidence levels above 99%.

Using three inducers yielded results that resemble those shown in FIG. 14 where we used six inducers. Again, we see the mean predictive accuracy of Troika is better than of Stacking or of StackingC. Troika accuracy is better than the mean accuracy of the best base-classifier selected by X-VAL (cross validation). Stacking is still second best, and StackingC remain the worse ensemble.

A statistical analysis of the accuracy results on the entire dataset collection indicates that
(1) in six datasets Stacking achieved significantly lower accuracy compare to Troika's;
(2) in none of the datasets Stacking excels Troika;
(3) in ten datasets StackingC achieved significantly lower accuracy compare to Troika's; and
(4) in none of the datasets StackingC excels Troika.

Statistical analysis of the ROC results of the entire dataset collection indicates no significant difference between all the ensemble schemes, although Troika has a trifle advantage on average.

Statistical analysis of the execution time reveals that there is a difference between ensemble methods. Using the Bonferroni-Dunn test with a confidence level of 95% shows Troika execute time is shorter compares to StackingC.

The null-hypothesis that all ensemble methods perform the same using three inducers was rejected using the adjusted non-parametric Friedman test with a confidence level of 95%. Using the Bonferroni-Dunn test we could reject the null-hypothesis that Troika and Stacking perform the same at confidence levels of 92%. Using same test we could also reject the hypothesis that Troika and StackingC performs the same at confidence levels above 99%.

Using one inducer yielded very different results compare to using three or six inducers. The mean predictive accuracy of Troika, though better than of StackingC, was only slightly better than of Stacking. Troika accuracy still manage to be is better than the mean accuracy of the best base-classifier selected by X-Val.

Statistical analysis of the ROC results of the entire dataset collection indicates no significant difference between all the ensemble schemes. Statistical analysis of the execution time reveals that there is a difference between the ensemble methods. Using the Bonferroni-Dunn test with a confidence level of 95% shows Troika has a longer execute time compares to Stacking and StackingC.

FIGS. 17, 18, 19 and 20 present the four Troika's ROC graphs, computed from the results on Vehicle dataset using 6 inducers. Each graph belongs to one of Vehicle's class.

We can observe from the graphs above that there is a consistent advantage to Troika in all classes of Vehicle dataset. Although, in general, we found no significant difference between all three tested ensemble schemes concerning area under ROC graph, there is an advantage to Troika in multiclass datasets where there is sufficient number of instances in dataset.

As indicated hereinbelow, there are several methods for converting multiclass classification tasks into binary classification tasks. There are two reasons why we had made the effort to experiment different kinds of class binarization methods. First, recall that our primary requirement from the base classifier was that they will be given as an input to all ensemble schemas uniformly, so that an acceptable comparison between all ensemble schemes could be made. This, we had successfully implemented by training the base classifiers separately from the ensembles. So after supplying each ensemble with the same base classifier, there could be no argue that some difference in the training methods of Troika and the other ensembles bias the results in favor of Troika; still one question remains. Is it possible that the selected binarization method (i.e. 1-1) in itself 'helps' Troika more than it 'helps' the other ensembles? To answer this question we needed to remake the experiments (at least some of them) using another kinds of binarization methods and find out if our primeval choice of binarization method is to blame with Troika's good performance.

The second reason was the disappointing results obtained by StackingC. StackingC is designed as an improvement of Stacking, and, as shown in our experiments, it had performed even worse than Stacking, especially in multiclass datasets which it should performed better. We suspected that StackingC is inefficient when its base-classifiers are trained using 1-1 binarization method; as there is greater number of base classifiers, the chance that each StackingC's meta classifier will predict correctly decreases and therefore StackingC's ability to correctly predict also decrease. Our experiments results emphasize this drawback; we see it baldly in Segment, LED7, Vowel, KRKOPT and Letter datasets. Each one of those datasets has at least 7 classes. There is a considerable drop of accuracy on those datasets compare to Stacking or Troika. Thus our hypothesis is that the performance of StackingC will increase dramatically, especially when using a multiclass datasets, when base classifiers binarization method will be changed.

The configuration of Troika, Stacking and StackingC were left untouched from previous experiment. We had, again, tested all ensembles using one, three and six induces. The difference, then, from first experiment, part from fewer tested datasets, is solely the method of binarization we used in the training of the base-classifiers.

We had tested three arrangements for base-classifiers trainings. Two are binarization methods; the 1-1 (one-against-one) and the 1-All (One-against-All) methods, and the last is a non binarization method AAA (All-against-All), in which base classifiers train on the entire train-set, without any class-binarization (the default training method).

One-against-all (1AA) is the simplest arrangement method. When given a problem with k classes, k binary classifiers will be produced by using this method. Each classifier is exercised to distinguish a class $C_i$ from the remaining classes. The final prediction is usually given by the classifier with the highest output value, as done in StackingC, or by combining them in some manner.

On the other hand we term the methodology used in the first experiment as one-against-one (1A1). Recall that this methodology consists $$\frac{k(k-1)}{2}$$

predictors, each differentiating a pair of classes $C_i$ and $C_j$, where i≠j. To combine the outputs produced by these classifiers, a majority voting scheme is applied. Each 1A1 classifier gives one vote to its preferred class. The final result is the class with most of the votes.

As in the first experiment, we had measure the same three metrics, namely, accuracy, ROC and execution time. FIG. 21 shows that Troika performs better than its rivals regardless of binarization method. In total, it wins 7 out of the 9 (78%) experiments, 5 of 6 (83%) when using three inducers and 3 out of 3 (100%) when using six inducers. The class binarization does has its effect also; we were little puzzled to find out that the best results came from using AAA method which does not use class binarization at all. It contravenes our belief that the use of class binarization will surely produce better results, although using 1A1 along with three inducers was better than the using AAA with one or three or inducers. We noticed that StackingC had made a remarkable revivification when we used base-classifiers training method other than 1-1; it won Stacking in 5 out of 6 experiments where base-classifiers training methods were 1-All and AAA. It even won Troika once using 3 inducers and AAA. In total, the evidence shows that troika is superior to Stacking and StackingC when using more than one inducer for base-classifiers.

We can see from FIG. 22 that Troika performs better than its opponents, again, regardless of binarization method. In total, it wins 8 out of the 9 (89%) experiments, and 6 of 6 (100%) when given three or six inducers. AAA training method this time won second place. We got best performance using 1A1 coupled with three inducers. In a matter of fact, all ensemble methods had had their peak ROC results when using this exact configuration. The poorest results always came along with the used of single inducer regardless of base-classifiers training method, but, on the other hand, there wasn't hard evidence that using six inducers, rather than three, yields better results.

We can see from FIG. 23 that Troika execution time is significantly better than its opponents when using 1-1 binarization method. One of the explanations for this particular result is that when using 1-1, base-classifiers count is much higher than when using 1AA, which is even higher than when using AAA. This proves our claim that when number of base-classifiers becomes greater Troika execution time, relatively to Stacking and StackingC, become longer in slower rate. We can see that Stacking took longer to execute when it used three inducers rather than using six. It is a very strange finding indeed, not quite comprehensible. Well, this phenomenal is a result of our distributed experiment. We had used different computers to perform experiments in which we used 1, 3 and 6 inducers. The one which run the experiments that used three inducers, happen to be a much slower computer, slow enough to make these ridiculous results. As a matter of fact, this does not affect our conclusions, because when we compare execution time of the three ensembles, we actually compare how each function, given the number of inducers and method of base-classifiers training, thus eliminating the between treatment effect.

Finally, we can see that Troika execution time was the longer then other ensembles when using AAA base-classifiers training method. In this particular method, where minimal base classifiers where induced, the large number of combining classifiers in Troika was the giving factor, therefore Troika execution time was the worst. So far the results have shown that troika excels Stacking and StackingC in terms of accuracy, regardless of base-classifiers binarization method. We also had shown Troika is preferable, in terms of execution time, especially when having many inducers to combine. In addition Troika's AUC mean is greater than of Stacking and of StackingC. However the statistical significance has been separately examined for each dataset. In this section we use the statistical procedure proposed in [Demsar J., Statistical comparisons of classifiers over multiple data sets, J. Mach. Learn. Res. 7 (2006) 1-30.] to conclude which algorithm performs best over multiple datasets. First we used adjusted non-parametric Friedman test with a confidence level of 95% to determine whether the difference between the ensemble methods is significance in general. Later, if we found a significance difference, we used the Bonferroni-Dunn test with a confidence level of 95% (when not specified otherwise) to find which ensemble differs from Troika. The summary of the results are provided in FIG. 24. The "+" sign indicates that the degree of accuracy of Troika was significantly higher than the corresponding algorithm at a confidence level of 95%. The "=" sign indicates the accuracy was not significantly different. The "+ (xx %)" superscript indicates that the degree of accuracy of Troika was significantly higher than the corresponding algorithm at a confidence level of xx %. The summary table indicates that in most configurations, Troika has significantly prevailed Stacking and StackingC accuracy.

A close examination of the results shown in FIGS. 14, 15 and 16 indicate that there are some datasets which disagree with our intermediate conclusions. Troika performs worse than Stacking in both Zoo and Soybea datasets. These poor performance of Troika in both datasets emphasize Troika's weaknesses. Zoo dataset has seven classes, 101 instances and when trained using 1-1 binarization method, 252 base-classifiers are trained. Soybean dataset contains 19 classes and 683 instances. We explain these poor results of Troika with the small number of instances in respect with number of classes. While Stacking and StackingC has one layer of combining layers, Troika has three. This attribute of Troika, forces Troika to spread the training meta instances with the three combining layers, therefore each layer gets fewer instances than Stacking or StackingC meta combiner gets. When there are enough instances in the datasets, this is not a major drawback. But when the original number of instances in the dataset is very small in respect to the number of classes, this may lead to an inferior ensemble. Specifically, we found the following index useful for deciding which ensemble method to use. The index is defined as the number of instances divided by the square of the number of classes. For example in 1A1 binarization method Troika should be chosen if the dataset index is higher than 3.

Another important finding from our experimental study indicates that using StackingC along with base-classifiers which were trained using 1-1 binarization method yields very poor ensemble. This emphasizes another good attribute of Troika; assuming that some or all of the base-classifiers may not, or could not be trained on more than two classes of a multiclass datasets, then Troika will have a large advantage over StackingC and Stacking; over the first, for it yields poor ensemble when coupled with base-classifiers trained using 1-1 binarization method as already shown, and over the later, because it is simply not that good with multiclass datasets.

Hereinafter, we investigate another interesting parameter; the effect of classes number on Troika performance. In order to answer the question in the title we took the KRKOPT dataset, which initially has 17 classes and manipulated it several times. This dataset has been examined with increasing number of classes in order to examine the relation between the number of classes and the predictive performance. The manipulation was very simple; for the creation of the first derived dataset, "KRKOPT-2-clss" we started with the original KRKOPT dataset (FIG. 25) and filter only instances of the two most prominent classes (the classes which has the most instances), then to create the "KRKOPT-3-clss" we did exactly the same procedure as with "KRKOPT-2-clss", but filtered only the instances of the three most prominent classes and so on with "KRKOPT-4-clss", "KRKOPT-5-clss", "KRKOPT-6-clss" and "KRKOPT-7-clss" (FIG. 26). At the end of this process we had six datasets, each has different class count and different number of instances. Table 18 specifies the list of datasets which were used in this experiment.

In this experiment we used the same ensembles configuration as we did in the previous two experiments. Our metrics had not been changed; accuracy, AUC and execution time. All base-classifiers where trained using 1-1 binarization method.

Figure 27:
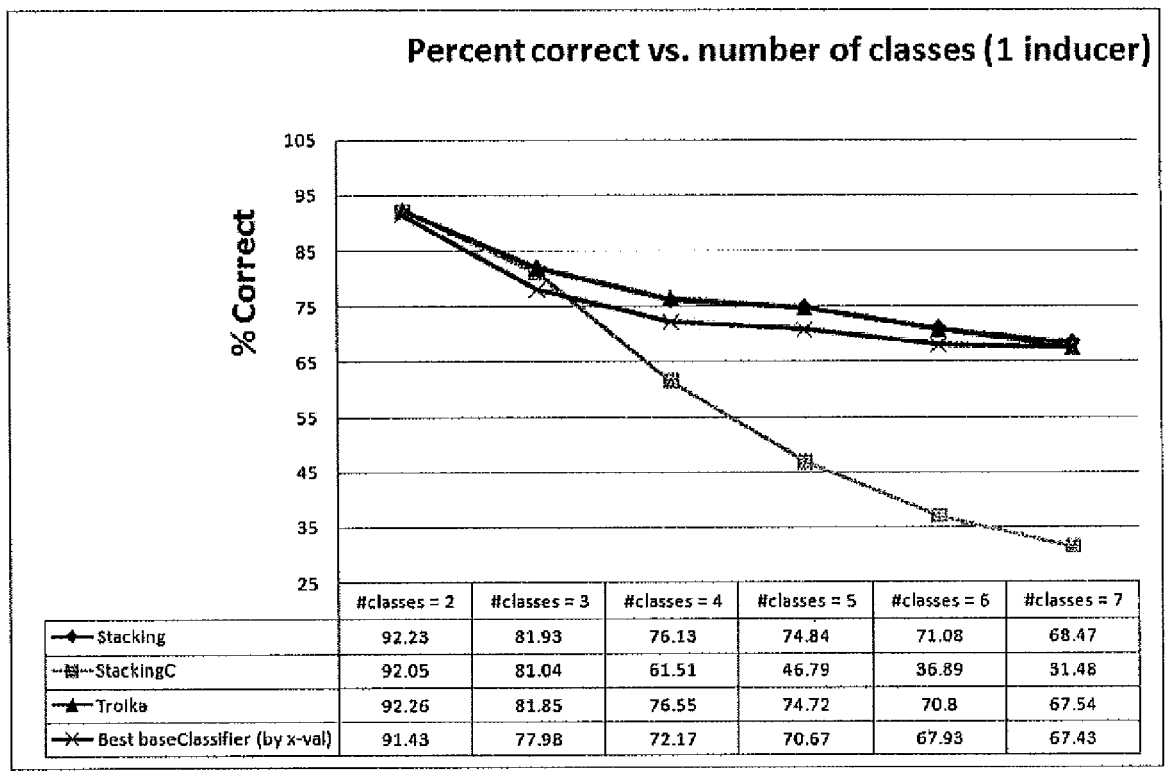
FIG. 27 shows the correct prediction rate as function of classes count in datasets using one inducer (J48)
Figure 28:
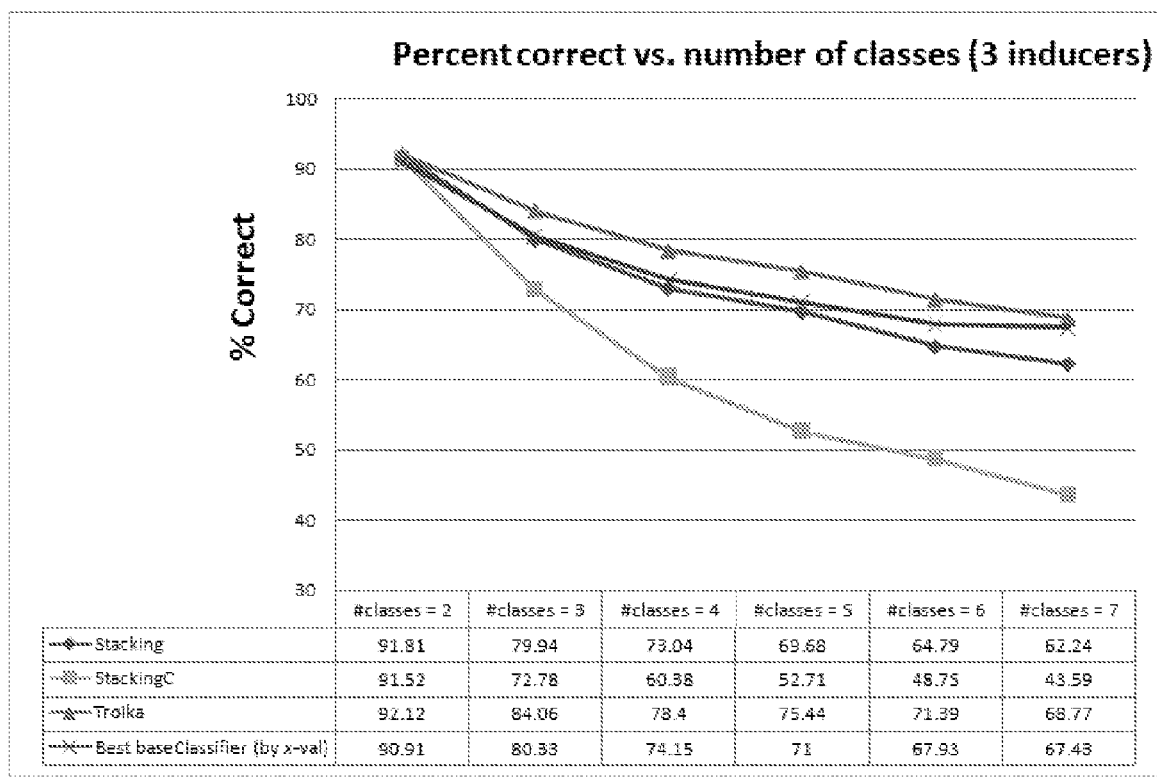
FIG. 28 shows the correct prediction rate as function of classes count in datasets using three inducers (J48, IBK, and VFI)
Figure 29:
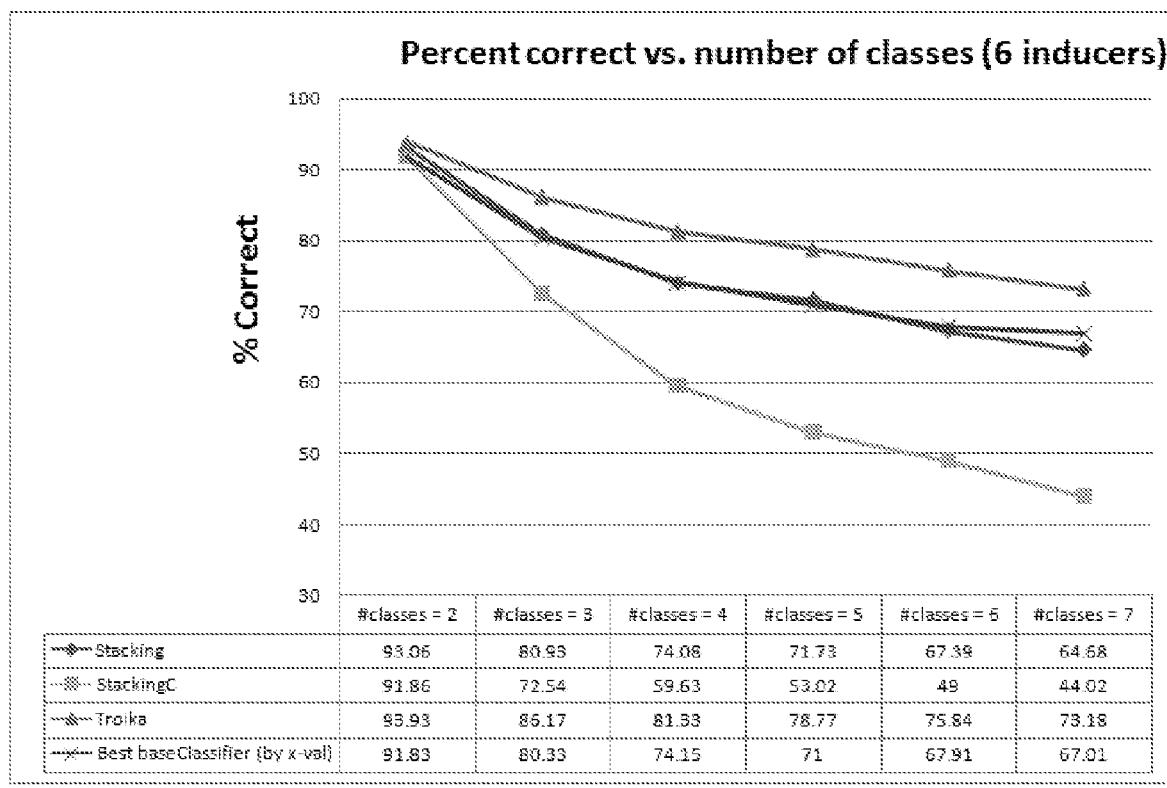
FIG. 29 shows the correct prediction ratio as function of classes count in datasets using six inducers (J48, IBK, VFI, Part, BayesNet and SMO).

FIGS. 27, 28 and 29 present the accuracy results of Troika, Stacking and StackingC when using 1, 3 and 6 inducers respectively. We show here only the Accuracy.

From the FIG. 27, it is evident that Troika and Stacking are pretty much close with small advantage to stacking. This came with no surprise to us since we were using only one inducer. On the other hand, StackingC accuracy performance is free falling while number of classes in datasets increases. This is the effect we had already seen in previous experiments. Again the blame is the 1-1 binarization method we used to train the base-classifier. Stacking and Troika accuracy is better than the best base-classifier selected by cross-validation.

From FIG. 12, we can learn that Stacking and Troika have same accuracy rate when having 2-classes dataset. Then, when number of classes is three a gap between the accuracy of those two is formed, in favor of Troika. As the number of classes count in data-set increases, this gap enlarges. StackingC accuracy performance continues to free falling while number of classes in datasets increases. This time, Troika alone has better accuracy than the best base-classifier selected by cross-validation. It seems that adding inducers to ensemble had damaged Stacking accuracy.

Although embodiments of the invention have been described by way of illustration, it will be understood that the invention may be carried out with many variations, modifications, and adaptations, without exceeding the scope of the claims.

The invention claimed is:

1. A method for improving stacking schema for multiclass classification tasks by combining based classifiers in three stages:
   a) combining all base classifiers using the one-against-one specialist classifiers and providing a specialist classifiers prediction;
   b) learning the prediction characteristics of said specialist classifiers using meta-classifiers wherein said meta-classifiers are trained using one-against-all class binarization and regression learners for each class model; and providing a meta-classifiers prediction; and
   c) producing a final prediction;
wherein said method comprising:
   building predictive models based on stacked-generalization meta-classifiers;
   combining classifications to build a new scheme from at least two layers;
   converting multiclass classification problems into binary classification problems;
   improving ensemble classifiers using stacking;
   improving accuracy differences, accuracy ratio, and runtime classification in multiclass datasets; and
   predicting the class of a value.

2. The method according to claim 1, wherein the specialist classifier is based on dichotomous models.

3. The method according to claim 1, wherein an output is a probability value, which is an input instance that belongs to a particular class.

4. The method according to claim 1, wherein a specialist classifier uses at least two meta-classifiers that are combined.

5. The method according to claim 4, wherein each meta-classifier is in charge of one class only.

6. The method according to claim 4, wherein all the specialist classifiers are able to classify its own class.

7. The method according to claim 1, wherein the meta-classifiers are trained in one-against-all fashion.

8. The method according to claim 1, wherein during the third stage a super classifier is used.

9. The method according to claim 8, wherein a final prediction model is produced.

10. The method according to claim 8, wherein the inputs of the super classifier are the outputs of the meta-classifiers.

11. The method according to claim 8, wherein the super classifier learns the conditions in which at least one meta classifier predicts correctly or incorrectly.

12. The method according to claim 8, wherein the super classifier outputs a vector of probability being the final produced decision.

* * * * *